(12) United States Patent
Mead

(10) Patent No.: US 7,963,815 B2
(45) Date of Patent: *Jun. 21, 2011

(54) SHAPE-ADJUSTABLE MOLD, SKIN AND INTERIOR-CORE STRUCTURES FOR CUSTOM BOARD PRODUCTION

(76) Inventor: Kirby J. Mead, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,723

(22) Filed: Mar. 24, 2005

(65) Prior Publication Data

US 2005/0184432 A1 Aug. 25, 2005
US 2007/0145638 A9 Jun. 28, 2007

Related U.S. Application Data

(63) Continuation-in-part of application No. 10/436,686, filed on May 12, 2003, now Pat. No. 6,878,025, which is a continuation-in-part of application No. 09/743,760, filed on Jan. 12, 2001, now Pat. No. 6,623,323.

(60) Provisional application No. 60/176,136, filed on Jan. 14, 2000.

(51) Int. Cl.
*A63C 5/03* (2006.01)

(52) U.S. Cl. .......................... 441/74; 114/357

(58) Field of Classification Search ................. 114/357; 441/74; 440/74
See application file for complete search history.

(56) References Cited

U.S. PATENT DOCUMENTS

| | | | | |
|---|---|---|---|---|
| 3,802,010 A * | 4/1974 | Smith | ............................ | 441/74 |
| 3,993,527 A * | 11/1976 | Ohta | ............................ | 156/245 |
| 4,255,221 A * | 3/1981 | Young | ............................ | 156/382 |
| 4,551,290 A * | 11/1985 | Mizell | ............................ | 264/46.6 |
| 4,767,369 A * | 8/1988 | Snyder | ............................ | 441/68 |
| 4,798,549 A * | 1/1989 | Hirsch | ............................ | 441/74 |
| 4,964,825 A * | 10/1990 | Paccoret et al. | ............... | 441/74 |
| 5,094,607 A * | 3/1992 | Masters | ........................ | 425/429 |
| 5,266,249 A * | 11/1993 | Grimes et al. | ............... | 264/45.2 |
| 5,512,219 A * | 4/1996 | Rowland et al. | ............... | 264/1.6 |
| 6,623,323 B1 * | 9/2003 | Mead | ............................ | 441/74 |
| 6,878,025 B2 * | 4/2005 | Mead | ............................ | 441/74 |

* cited by examiner

*Primary Examiner* — Stephen Avila
(74) *Attorney, Agent, or Firm* — Michael J. Hughes

(57) ABSTRACT

A mold and construction method for forming aquatic sports boards is provided. The method and molds provide skin and interior core structures made shape-adjustable by a pre-molded perimeter rail. Division(s) in the structural exterior skin allow the skin core to be trimmed and bonded to a variety of convex, shape-defining core structures to produce a plurality of different shapes. A reusable shape-defining mold allows the board structure to be modified in shape. The mold is reversible and male/female configurations produce convex, shape-defining board substrates for a wide array of custom designs.

14 Claims, 11 Drawing Sheets

SHAPE-ADJUSTABLE MOLD, SKIN AND INTERIOR-CORE STRUCTURES FOR CUSTOM BOARD PRODUCTION

CROSS-REFERENCE TO RELATED APPLICATION

This application is a continuation-in-part of application Ser. No. 10/436,686 filed May 12, 2003 (now U.S. Pat. No. 6,878,025 issued 12 Apr. 2005) which in turn is a continuation-in-part of application Ser. No. 09/743,760 filed Jan. 12, 2001 (now U.S. Pat. No. 6,623,323 issued Sep. 23, 2003), which claims priority from U.S. provisional Application 60/176,136, filed Jan. 14, 2000.

BACKGROUND OF THE INVENTION

1. Field of the Invention

This invention relates to methods and apparatus used in the design and manufacture of surfboards, sailboards or similar aquatic boards, referred to generically herein as "board" or "boards."

2. Description of the Related Art

Surfboards and sailboards are similar in shape and basic structure—the board typically has a high strength exterior skin covering that protects and is supported by very low-density material in the interior core; in construction, moldable plastic is used for the compound curvatures and sharp trailing edge contours conducive to a low-drag hydrodynamic shape; the board's primary strength is usually derived from a woven fabric, made from high-strength glass, carbon or aramid fiber, that is imbedded in the plastic to form a fiber-reinforced plastic or plastic composite skin.

The composite skin, which is very thin, can be reinforced with specially manufactured high-density PVC sheet foam, end-grain balsa or honeycomb core materials to form a "structural sandwich" or "cored composite." The stiff, lightweight core material, used as a substrate to separate the high-strength composite layers on either side, creates a fundamentally different structure—the sandwiched core delivers the stiffness and rigidity of much thicker material, but at a fraction of the weight, and provides the impact resistance and compressive strength the very thin layers of plastic composite lack.

The composite core materials and reinforcing fabrics impart a high degree of stiffness and very high strength but, unlike the weaker plastics and foamed plastics with which they are combined, have a limited capacity to conform to compound curvature (i.e., a surface that curves in two directions at once). Where the curvature is severe, divisions are necessary to prevent structural defects such as wrinkles in the reinforcing fabric, or the breakage and/or failure of the core material to conform to the required shape. Since a break in the continuity of either material causes a large reduction in strength, the placement of a division—usually referred to as a joint or seam—is critical to the overall structural integrity of the board.

Currently, with molded methods of production, or in custom "one-off" manufacture (i.e., when the board is fabricated by hand), a joint or seam is required to accommodate the sharp curvature at the board's perimeter edge or "rail"—this division creates a number of seemingly unrelated but very serious problems, which increase manufacturing costs and seriously compromise the board's potential strength.

In prior art molded manufacture, for example, the sharp curvature around the board's perimeter edge compounds a number of very basic drawbacks inherent in the mold's concave configuration itself—the structural problems and high manufacturing costs that result make the concave female mold of the prior art fundamentally unsuited for board production. The problems begin with the mold's inward curving surface: when the reinforcing fabric is saturated by hand, the resin naturally tends to flow out of the fiber and pools in the concave cavity of the mold; the mold's sharp edge contours then create a dam that makes it very difficult for the squeegee to completely remove the excess—the result is a weak, heavy resin-rich skin. In areas of severe concave curvature, wrinkles in the reinforcing fabric easily occur, and are difficult or impossible to remove—pulling the fabric taut tends to lift it from the surface of the mold; pushing on the fabric is analogous to pushing on a string, and causes wrinkles to (re)appear.

To minimize the above problems, in the prior art the mold is divided into top and bottom halves; with the relatively flat and shallow surface the fabric is easily aligned and much of the excess resin can be successfully removed—the placement of the part-line, however, is in the worst position possible: at the board's exposed perimeter edge. Because the division of the mold also breaks the continuity of the high-strength fiber, the mold-seam on the finished board has only a fraction of the strength of material where the fiber is fully intact. The design of the joint is then compromised by the limitations of the mold's concave surface. The mold-seam is far stronger when reinforcement is applied to the interior of the joint—the inside surface of the joint, however, becomes completely inaccessible once the mold is closed. The mold-seam is therefore typically reinforced after the board is removed from the mold; this adds weight to the already resin-rich skin, and sufficient rework to negate much of the labor-saving advantage.

The difficulty molding the board's interior foam core then raises production costs further still. Because the expansion of plastic foam involves heat (e.g., polyurethane foams undergo an exothermic reaction; steam is required to expand EPS "bead" foams), there is both an expansion and a very slight cooling contraction cycle in the molding of the foam—the slight cooling contraction makes it very difficult to pre-mold the board's interior foam core to sufficiently tight tolerances to eliminate potential voids between it and the interior surface of the closed mold and, when the expansion of the foam occurs in the mold, the cooling contraction begins before the foam has fully hardened, which often causes poor adhesion or an inconsistent skin-to-interior core bond.

To reduce the problem, in the prior art the foam is contained in an extremely strong mold and the very high outward pressure generated by the foam's expansion is used to compress the foam against the interior surface of the mold to enhance adhesion and attain an adequate skin-to-interior core bond. Drawbacks include the high cost of the mold (the mold typically has steel reinforcing jigs attached and is held in a hydraulic press or by other mechanical means to prevent buckling, separating or failure under the high pressure of the expansion) and, because of the compression of the foam against the surface of the mold, the higher density of the foam and added weight,.

The additional problem is that the plastic composite is thin and bendable, and the resin generally shrinks between five and six percent as it cures. The direction of shrinkage is primarily into the fiber and against the surface of the mold, where it is held in place by the perfect vacuum that develops as the resin hardens and cures. Because the two halves must eventually meet at a precise point around the perimeter, the mold functions to stabilize the laminate, and prevents distortion or shrinkage of the resin from creating a mismatch between the board's two opposing sides. The skin must then be fully cured and receive the support of additional material (ordinarily provided by the bond between the two opposing sides and the board's interior core) before it can be removed from the mold. The order of application is a major problem: the fact that the least stable and longest curing material (i.e., the composite skin) is applied to the mold first, and quickly curing foam(s) or pre-molded interior core structures are added later, lengthens the mold-cycle and causes very slow production.

a. Molded Methods of Production

With excess weight, high-capital costs, and lack of any competitive advantage in terms of price, the molded fiberglass skin/polyurethane foam core surfboards manufactured in the early nineteen-sixties, soon after the introduction of polyurethane foam, were derisively referred to as "pop-outs" due to their structural inferiority. The commercial production of molded hollow boards was attempted in the early nineteen-seventies, but was also very brief-absent the interior foam core, the lack of an effective joint between the board's top and bottom sides (see, e.g., U.S. Pat. No. 3,514,798 to Ellis) caused the mold-seam at the perimeter to split open with relatively modest impact; with higher impact often detaching the skin from the interior support structure, the damage was difficult or impossible to repair.

Reviewing prior art clearly shows the structural defects and compromises caused by the concave configuration of prior art female molds. U.S. Pat. No. 3,802,010 to Smith, for example, suggests that the mold-seam at the board's perimeter can be eliminated by dividing a conventional female mold into right and left halves, and laying the saturated fiberglass fabric into the mold in a single sheet. According to the invention, the centerline division means that there are no joints along either side or rail where the board is subject to the greatest beating during use.

What is completely ignored is the fact that the board's outline around the perimeter is roughly twenty percent longer than the straight line along the axis of symmetry—if the part-line is placed at the shortest distance between the nose and tail of the board, the fiberglass must elongate a total of ten percent per side to cover the perimeter of the mold, while maintaining its original length at the center. Since fiberglass is not elastic, the fabric must be carefully cut and trimmed to conform to the shape of the mold, or the ten percent that is excess will appear as folds and wrinkles in direct proportion to the differential in length.

The mold's deep internal cavity and lack of access makes it impossible to accurately trim and create an overlapping joint in the fabric at the perimeter of the mold, however, and also prevents the defects from being properly repaired. The sharp folds in the reinforcing fabric create voids if subsequent layers are applied on top—this precludes the possibility of adding fiberglass layers or the use of any composite core material at all, or using these materials to create a bonding/reinforcing flange between the two opposing sides. The two sides are therefore joined by pouring a very thick layer of adhesive into a concave depression in the foam core, creating a very weak and heavy mold-seam between the opposing sides. The invention suggests trading the well-known structural problems caused by the relatively shallow concave cavity of the prior art female mold, for the much larger defects of a very deep one.

The closely related U.S. Pat. No. 4,383,955 to Rubio et al. specifically identifies a number of the more obvious problems outlined above, and teaches a conventional solution: to improve access, the right- and left-hand mold configuration to Smith is given an extra division that turns it into quarters—with the four relatively flat mold surfaces, the fiberglass fabric can be successfully applied to the mold without wrinkles; moreover, with the accessible mold surface ordinary steps such as polishing, prepping and applying release agents to the mold become possible so that the board can subsequently be removed. From a structural or fabrication standpoint, however, there is no improvement at all—the extra division adds a mold-seam at the perimeter of the board, and neither disclosure addresses any of the well-known problems involved in molding the board's interior foam core.

In both inventions, the liquid pre-foam is poured into the mold cavity and allowed to rise parallel to the board's width. The foaming reaction of the polyurethane resin is deceptively simple, however, because when complete, even the mixing cup appears to make a perfectly acceptable mold. The hidden problem is that the expansion of the foam occurs before the resin begins to harden—because the mold configuration causes considerable upward movement during expansion, the foam's cellular structure tends to be destroyed against the interior surface of the board/mold, and released blowing agent or gas is concentrated in the same area area; this leaves large voids directly beneath the surface of the fiberglass skin, and little or no skin-to-interior core bond.

In the disclosure to Rubio, et al. the voids are identified, but the inventors incorrectly attribute the "soft spots" (i.e., the voids beneath the skin) to the expansion and contraction cycle of the foam (the soft spots are described as areas where the foam has "pulled away" from the fiberglass skin). They therefore suggest using a baffle to contain the expansion of the foam to compress it against the interior surface of the skin—a partial step towards the prior art method of containing the foam in a high-strength mold and hydraulic press. Neither invention has seen production, since prior art problems of molding the board's interior foam core, the length of the mold-cycle, and the weak or inadequate joint between the board's two opposing sides are neither noted nor addressed. In known methods of sailboard production, the latter two problems are "solved" by either foaming the resin matrix or eliminating the reinforcing fiber in the skin; both solutions therefore entail a major reduction in strength.

In low-cost methods of sailboard production, for example, blow-molding or rotationally molding techniques are used to blow or melt a thermoplastic resin to the surface of the mold; although this produces a continuous one-piece skin, production is relegated to beginner and entry-level sailboards due to the excess weight/inadequate strength caused by the lack of any composite material at all. The added drawback is that the interior foam core must be formed by injecting liquid pre-foam into the interior cavity of the closed mold, which involves the production problems outlined above.

Pre-molding the board's interior foam core is a very widely used alternative since it allows a major reduction in weight. The problem, as previously noted, is the difficulty of consistently pre-molding the foam to sufficiently tight tolerances to eliminate potential voids between the interior foam core and the surface of the mold. In the prior art, the lack of close tolerances is compensated for by saturating the reinforcing fabric with an epoxy resin that has a blowing agent added; with the laminate/interior core assembly contained in a heated mold and a mechanical press, the epoxy expands to fill any voids or discrepancies between the pre-molded interior foam core and the closed cavity of the mold. With the added stiffness of a PVC sheet foam layer sandwiched between layers of foamed laminate in the skin, the board is light in weight, and the quickly-curing foamed resin and rapid mold-cycle makes production costs competitive with the lower-cost methods of sailboard production outlined above.

An illustration of the low production costs using the method is provided by the U.S. Pat. No. 4,713,032 to Frank, the specification of which is incorporated herein, in which the prior art foamed epoxy laminate—often referred to as a "thermal compression-set epoxy" due to the high pressure and temperature cure—is replaced with a quickly-setting, foamed polyurethane resin for a very rapid mold-cycle of about twenty minutes per board, and high production from the molding tool of as many as twenty-four boards per day.

Using either resin, the gap between the interior core and the closed mold results in a fairly thick, resin-rich laminate, made weak by the foaming of the plastic in the skin. Because much higher-strength may be had using non-foaming structural layers of composite laminate, the strength-to-weight ratio of the foamed laminate skin is typically well below expensive high-performance sailboards, which eliminate the blowing agent in the resin matrix to create a much higher strength "structural sandwich" or "cored composite" skin.

b. Structural Sandwich/"Advanced Composite" Production

The structural sandwich is expensive to fabricate because of the lengthy mold-cycle. In production, vacuum pressure is used to remove voids and entrapped air from the composite laminate, and conforms the skin core to the shape of the mold; to prevent any spring-back of the skin core the skin material remains in the mold under vacuum pressure for about two to three hours, until the resin has completely cured. The added drawback is the difficulty removing excess resin from the skin—in sandwich skin fabrication, the skin core layer creates a buffer that blunts the effectiveness of the squeegee on the interior layers of laminate against the surface of the mold, and the mold's sharp, upraised edge contours tend to create a dam; the vacuum-bagging procedure then requires an airtight surface and seals the entire mold, and prevents any excess resin from escaping during cure. The further problem is that the stiffness of the core material generally exceeds the pressure available with vacuum (14.7 psi), which can prevent it from being fully conformed to the sharp curvature at the board's perimeter rail, particularly at the tail; this complicates the design of the joint and the overall structural integrity of the board as well.

The U.S. Pat. No. 4,964,825 to Paccoret, et al. illustrates a number of the problems outlined above; it reveals a large gap in the sandwich structure and very poor joint design at the board's perimeter edge (a conventional inward-turning bonding flange is depicted). During production, the mold's sharp edge contours, the fabrication of the sharply inward curving bonding flange, and the complete seal of the vacuum-bag combine to prevent any of the excess resin from escaping prior to cure. The invention is directed to structural improvements in the fin-box/mast track areas of the board; the design of the mold-seam and the removal of excess resin are much larger problems, but neither is addressed.

The U.S. Pat. No. 5,023,042 to Efferding discloses a mold designed specifically for sandwich skin construction; the complications in this case are due to the difficulties of using a low-density, pre-molded EPS (expanded polystyrene) "bead" foam for the interior core. In the disclosure, the PVC sheet foam/wet epoxy laminate fits into molded-in recesses in the EPS foam core and the entire assembly is placed in the mold, the exterior surface of which precludes resin removal by hand. Vacuum pressure is used to press the components tightly together but exceeds the compressive strength of the foam, causing it to distort and crush; the vacuum also withdraws air trapped between the individual beads of foam—the "outgassing" of air from the foam causes major structural defects in the form of large voids and pockets of entrapped air in the composite laminate.

To prevent these problems, Efferding suggests using a vacuum bore to withdraw the air from within the foam and discloses a novel mold with a flexible perimeter portion that, under full vacuum, bulges outward evenly and allows the EPS interior core to assume an even, permanent compression set during cure. Structural compromises include the large gap in the sandwich skin structure at the board's perimeter rail, and the absence of internal spars, shear webs, or hollow, weight-reducing areas in the board's interior core—all of which would create distortion problems and/or prevent the board from compressing evenly during cure. The added problem is the high resin content in the skin—to draw vacuum the mold completely encases and seals the board structure and prevents the excess resin applied in the laminating step from escaping during cure. A low temperature oven is also used to speed production, but costs are still very high due to the lengthy mold-cycle of just under three hours.

The inventor notes that known methods of sailboard production produce boards having a mold-seam at the point of greatest breadth thereof; the word "seamless" in the title of the invention refers to the modest improvement in the placement of the mold-seam—which is not in the expected location, but on the sharpest point of the rail.

Borrowing directly from the general mold configuration disclosed by Efferding, the U.S. Pat. No. 5,266,249 to Grimes III, et al., the specification of which is incorporated herein, teaches a method of forming interior joints in at least partially enclosed confined interior areas (see, e.g., the mold configuration to Smith) and an improved joint design as well, since the composite layers meet and form an overlapping joint at the perimeter rail. The fabrication of the joint, however, requires the use of extremely costly "advanced composite" material to prevent production problems caused by the mold's concave surface: the method uses the tackiness of the partially cured "pre-preg" epoxy laminate to adhere the deck layers of the honeycomb core to the walls of the mold; the bottom layers of the board are then assembled on an inflated bag, which doubles as a vacuum bag and provides the high outward pressure (i.e., at least 13 psi) needed to hold the composite skin/honeycomb core material in proper orientation and in pressurized contact with the mold throughout the cure.

According to the invention, there had previously been no method of applying fiber-reinforced plastic to the interior sides of mold-seams or joints; the inflated bag provides a very ineffective means for doing so, however, since its assembly adds considerable labor and limits the interior structure to a single support wall, rather than the higher strength and lighter weight afforded by a plurality of internal shear webs or supporting struts. Further, during assembly the inflated bag does not provide sufficient stability for the honeycomb core material to be accurately trimmed and glued—epoxy pre-preg core splice strips (strips of thermosetting epoxy that foam during the high-temp cure) are therefore required to fill the gaps or voids around the perimeter rail where the honeycomb core cannot be accurately fit.

Despite the obvious structural improvement over the prior art, the placement of the joint is still at the sharpest point on the board's perimeter rail, and its design is less than ideal—although the fabric is overlapped, the break in the reinforcing fiber and in the honeycomb core material will reduce the joint's shear and impact strength, and cause earlier skin detachment and/or failure of the joint at lower levels of impact. Much greater impact resistance can be had by eliminating the joint entirely: complete continuity of the core material would allow the continuity of the high-strength reinforcing fiber to be better maintained throughout the perimeter edge, and reinforcement could also be confined to the interior side. Higher impact strength could also be had by increasing the density of the core material throughout the exposed perimeter rail area itself.

More importantly, the mold's concave configuration makes it impossible to move the primary division between the two halves to the axis of symmetry—combining the joint with the support wall would create a far stronger board structure, since the support wall would provide an entire backup structure to reinforce the interior of the mold-seam in an area that is flat and only rarely exposed to high-point and impact loads.

As in the invention to Efferding, the mold completely encases and seals the board structure (bolts are depicted) and prevents any excess resin from escaping during cure. As noted above, an optimum fiber/resin ratio in the composite is extremely important: because the strength of the reinforcing fiber is usually several orders of magnitude higher than the resin (e.g., in a fiberglass composite, the tensile strength of glass, at roughly 500,00 psi, is about fifty times that of the resin, at 9-12,000 psi), excess resin in the composite actually weakens it. In sandwich skin fabrication, reducing the percentage of resin from the sixty to seventy percent range (by weight, and typical when the reinforcing fabric is saturated by hand) to the thirty-five percent level will usually double the compressive and flexural strength of the composite facing in bending—equally important, the weight saved can be used to increase the density of the stiff, lightweight sandwiched core. Because the improvement in strength that comes by increasing the density of the core is not linear—e.g., doubling the density of high-density plastic foam will usually triple its compressive strength—an optimum fiber/resin ratio in the laminate can more than double the flexural, compressive and impact strength of the structural sandwich skin as a whole.

Reducing the resin content of the laminate, however, requires special unidirectional fabrics or very tightly woven, difficult to saturate "crow-foot" or "satin" weaves of cloth, as well as a method for applying fairly high pressure to physically force the resin from the fiber, a lack of obstructions to allow the resin to actually be removed, and a barrier (e.g., a thin plastic film) to prevent air from re-entering the laminate (due to the slight spring-back of the fiber) once the pressure has passed. With current methods of production, efforts to employ these techniques have been less than completely successful because of the concave configuration of prior art molds, and the stiffness of the core material and the shape of the board at the rail—Paccoret et al. and Grimes III et al. therefore teach the use of extremely expensive "pre-preg" or "advanced composite" material to keep the resin content to an absolute minimum.

As the name suggests, in the "pre-preg" the reinforcing fabric is pre-impregnated with the precise amount of epoxy resin (by Hexcel, Ciba-Geigy etc.), the resin is then "B-staged" or partially cured, the material is shipped under refrigeration to the end-user (usually large airframe manufacturers such as Boeing etc.), the material is then placed in the mold and undergoes a high-temperature, high-pressure autoclave cure. Due to the prohibitively high material cost, the lengthy two to three hour mold-cycle (₂hr. to heat, 1-1 ₂hr. cure, ₂hr. to cool) and the high-temp, pressurized cure, the "advanced composite" or pre-preg laminate/honeycomb skin boards occupy only a small niche in the overall sailboard market.

The further drawback is that the generally hollow board structure is best used on very thick sailboards, where the higher overall volume of the interior foam core adds a great deal of weight but little strength, while a foam core may offer lighter weight with thinner, high-performance wave-boards (sailboards) and surfboards. The molds and methods outlined above, however, are not readily interchanged: the high-temperature and pressurized autoclave cure needed for the honeycomb core/pre-preg laminate (e.g., 250° F. and a minimum pressure of 13 psi), for example, typically exceeds the compressive strength of very low-density foams, and will melt polystyrene based foams (specified by Efferding, for example); special molds are also required for the mechanical/hydraulic press involved in attaining adequate adhesion using liquid resin pre-foams, whether the material is used as a fiber-reinforced foamed laminate in the skin or as the board's interior foam core. Hence, in the prior art, the configuration of the mold and the materials used in construction cannot be readily customized according to the design requirements of the board, or the performance preferences of the rider; compounding the problem, the mold's concave surface defines the board's exterior shape and restricts production to a series of exact duplicates.

Because of the very light weight and lower capital costs when the board is fabricated by hand, molded surfboard production has been very limited since the beginning of the "modern era," which began with the introduction of moldable plastic foam and fiberglass-reinforced plastic over four and five decades ago respectively, while custom "one-off" sailboards comprise a very significant portion of the overall market—particularly in high performance areas such as Hawaii. In surfboard and high-performance sailboard production, the wide range in size and shape requires a large and prohibitively expensive inventory of molds, and eliminates the many custom design modifications that are now made as a matter of routine—the concave configuration of prior art female molds prevents the board's width, planing area and lengthwise bottom curvature or "rocker" from being tailored to the individualized requirements of the rider; custom boards, therefore, must be fabricated by hand.

c. Custom or "One-Off" Board Production

In custom or "one-off" surfboard production, the board is individually hand-shaped from a polyurethane foam "blank;" the fiberglass and resin are then applied by hand over the shaped foam core. The process is labor-intensive and requires considerable skill, but the problems of molded manufacture are limited to a pre-production phase—the board's interior foam core is first molded by a separate manufacturer into a rough surfboard-shaped slab of foam before being shipped to the surfboard manufacturer to be used in the actual construction.

To enhance strength and better control the somewhat unreliable reaction of the low-density polyurethane foam, the blank is molded in an extremely strong, heavy mold made of reinforced concrete. This allows an excess of liquid pre-foam to be poured in the mold; as the foam expands, the excess compresses under high pressure against the surface of the mold and produces a density-gradient in the blank—the foam is soft and weak in the center and becomes progressively harder and denser towards the surface. To avoid removing too much of the harder, denser surface foam during shaping, the blank is molded close-to-shape, or as thin as possible. The close-to-shape molding increases the large number of blank molds required for surfboard production, and frequently leaves insufficient foam in the nose and tail areas of the blank for the shaper to produce the proper lengthwise bottom curvature or "rocker" on the board.

The molded-in rocker of the blank must therefore modified by the blank manufacturer—this is done by cutting the blank in half lengthwise and gluing the two halves to a wooden center spar or "stringer" individually cut to a specific rocker curvature. The rocker is usually selected from a list of stock lengthwise rocker modifications; Clark Foam of Laguna Niguel, Calif., (www.clarkfoam.com) provides a Rocker Catalog listing the dimensions of over two thousand different templates available to modify the molded-in rocker curvature of the more than sixty different blank molds offered for surfboard production. With shipping and inventory problems at both ends of production, manufacture of the blank is expensive, but essential, since the hand-shaping of the core allows the various design parameters of the board, including the width, volume, and rocker, to be adjusted according to the requirements of the rider.

After shaping, the fiberglass laminate is applied directly to the shaped foam core, which provides a smoothly curving convex surface. With a fiber-reinforced composite, a convex substrate provides the foundation for a stronger, lighter structure—excess resin is easily removed for higher strength and lighter weight, and joint creation is stronger and simplified—the fabric can be pulled taut and a double overlapping joint created to provide a protective covering for the very exposed perimeter edge or "rail," and the sharp convex curvature at the nose and tail as well.

Major drawbacks include the large amount of labor and extra coats of resin required to sand the overlapped area completely smooth; structurally, the primary problem is the board's very light weight—for higher performance, board weight has been consistently reduced to the point where the low-density interior foam core is no longer strong enough to fully support the board's thin exterior skin. The single fiberglass ply used on the bottom of the board will usually dent or fracture with moderate finger/thumbnail pressure, while the double or triple layer used to reinforce the tail area where the rider stands often fatigues, becomes permeable to water, then fails and completely delaminates under the repeated high pressure of the rider turning the board. Hand-shaping also limits the effectiveness of the longitudinal reinforcement—it makes wood the material of choice for the center spar and also makes it impractical to add top and bottom spar caps (i.e. the top and bottom reinforcing flanges in an I-beam)—the lack of effective longitudinal reinforcement leaves thinner surfboards in particular susceptible to breakage.

With current methods of production, the strength of the "one-off" or custom board is severely compromised by the roughly one-to-one weight ratio between the fiberglass skin and interior foam core—efforts to alter this ratio have been largely unsuccessful. The U.S. Pat. No. 5,569,420 to Van Horne, for example, suggests increasing the density of the polyurethane foam core—this is done by pouring out sequential lines of liquid pre-foam; the foam then expands, and each individual line of foam is left with a hardened arcuate shell on its exterior surface where the exposure to air has slowed the reaction of the foam. The process is repeated until a billet is formed; the foam for the board's interior foam core is then cut from the billet and hand-shaped the final dimensions. Although the density of the foam is increased, the invention eliminates one of the primary advantages of the one-off method of production, which is the extremely rapid mold-cycle in the molding of the blank (e.g., in the invention to Frank, a reaction retarder is needed to extend the rapid five minute setting time of the polyurethane resin in the foamed, fiber-reinforced plastic skin).

The U.S. Pat. No. 4,255,221 to Young teaches a laminated plywood skin created from individual layers of veneer which are conformed to the curvature of a hand-shaped interior foam core using vacuum pressure. To reduce weight, Young provides additional adjustable means outside the vacuum forming apparatus that squeeze excess epoxy from the layers and aid in conforming the wood to the curvature of the core. The difficulty is in forming an effective joint at the perimeter rail—since the veneer can break if the curvature is severe, the edge contours of the board are made by laminating strips of wood around the board's perimeter; after curing, the strips are hand-planed to the final dimensions and form a solid laminated wood perimeter rail.

In the disclosure to Efferding discussed above, the inventor describes developing a similar vacuum-bagging method for fabricating a sandwich skin sailboard. The use of composite skin core material greatly complicates the process, however. For example, at room temperature PVC sheet foam will typically break well before it reaches a right-angled bend, and its stiffness can exceed the 14.7 psi pressure available with vacuum and the compressive strength of the low-density EPS foam core as well; in addition, the lack of any reference point around the board's perimeter edge makes it very difficult to accurately trim the skin core material and eliminate the potential gap or mismatch between the board's two opposing sides. The inventor therefore makes no attempt to conform the high-density PVC sheet foam to the sharp curvature at the perimeter rail, but teaches that the skin core should be fit into recesses in the foam core. Efferding reports that it takes thirty to forty five hours to manufacture a professionally acceptable sailboard using the technique; to reduce labor, Efferding discloses and teaches the use of a novel female mold.

Prior art custom or "one-off" production currently lacks a strong, composite based skin structure capable of being fabricated on a convex surface such as plastic foam; in molded manufacture, the high production costs and structural problems are largely due to the concave configuration of prior art female molds and the placement of the part-line between the mold's top and bottom halves, which results in a mold-seam along the board's perimeter edge or rail. In the prior art, the two basic fabrication methods fail to address specific problems encountered in conforming the exterior skin materials to the sharp compound curvature at the board's perimeter rail, and suffer from a number of serious structural shortcomings and manufacturing drawbacks as a result.

SUMMARY OF THE INVENTION

In an embodiment of this invention, the board's structural exterior skin comprises a layer of thermoformed plastic that is continuous through the point of greatest breadth and area of sharpest curvature; the layer of thermoformed plastic forms a perimeter rail that connects the broad, generally planar top and bottom surfaces of the board; the skin encompasses foam, partially hollow chambered foam, or a plurality of internal shear webs or skin supporting struts; a high-strength bonding/reinforcing flange and/or interior foam core material joins the board's two opposing sides. The present invention discloses shape-adjustable molds and quickly fabricated, shape-adjustable skin and interior core structures that allow critical construction steps to be completed using a convex shape-defining surface—the board may therefore be produced without the high initial costs of constructing a prior art female mold, and the high manufacturing costs and structural problems resulting from its use.

In the present invention, the board's high strength and low production costs are due to an inexpensive molding or pre-forming step, in which the configuration of the mold and fabrication method are specifically adapted to conform a layer of skin material to the severe compound curvature around the board's perimeter edge or "rail" (note: the term denotes the edge contours on either side of the point of greatest breadth necessary for a hand-held grip, and includes at least a portion of the board's generally flat bottom). With the high degree of compound curvature at the board's perimeter edge, it is possible to pre-mold the area at the perimeter rail and form a substrate layer having a very stiff and stable shape. The exterior facing layer(s) may then be applied to the substrate layer, rather than to the mold; the substrate provides a shape-defining surface that can function as a mold and define the shape of the board as the longer-setting bonding and/or laminating resins harden and cure.

The pre-forming step fundamentally changes the production process and the nature of the mold itself: in the present invention, for example, a first rigid shape-defining surface may be used to pre-define the board's exterior shape; a second very thin (and optional) layer of material may then be used for the smooth surface in the board's exterior skin. With different mold surfaces performing separate functions, each becomes much less expensive to construct; in addition, the production steps can be ordered for very rapid production, and both the mold and the board structure can be modified in shape.

In the present invention, for example, the pre-formed perimeter rail can be molded separately and provide an adjustable template that can be bent to cut deck and bottom skin core panels from sheet core material or partially pre-fabricated sheet core material (e.g., skin core material with high-strength composite laminate fully cured on the interior side); the panels may then be bonded to convex shape-defining foam, a prefabricated spar, or other material used in the interior core, with the pre-formed rail completing the perimeter edge and connecting the board's top and bottom sides. The pre-forming step also allows one entire side of the board to be molded from a single thermoplastic sheet—the continuous surface at the rail where the board's top and bottom surfaces intersect allows a division to be placed along the axis of symmetry, or on one side of the rail between the board's top or bottom sides. The location of the division then allows the board to be modified in shape: a division at the axis of symmetry, for example, allows the board's width to be altered along the longitudinal centerline of the board, the tail can be made wider relative to the nose and vice-versa; the rail can also function as a hinge so that the board's longitudinal profile and transverse curvatures may be defined by pre-fabricated material used in the interior core. In each case, the shape-defining skin and interior core materials provide shape-adjustable substrates that pre-define the board's exterior shape, and then function as a mold as bonding resin(s) and/or layer(s) of high-strength facing material harden and cure. The principles outlined above may be used to create a reusable shape-defining mold, and the materials used in the construction of the mold may provide shape-defining surfaces that become part of the board structure itself.

For example, in the pre-forming step, the skin core will bridge small gaps and mask minor imperfections on the surface of the mold; this allows the shape-defining mold to be divided into separate subparts designed to be moved, then fixed and set, so as to change dimensions, describe different curves and modify various parameters of the board's design. In the present invention, for example, the bottom panel of the mold may be designed to bend lengthwise to alter the rocker curvature of the board, the deck panel can be made adjustable to control thickness, and a flexible perimeter rail component may be used to modify the board's outline and width; added rail segments and/or adjustable nose and nose and tail components then allow changes in length at either end. Reference for the movement and fixed positioning of the mold subparts may be provided by an external structure, such as a mold base, which may be placed parallel to the mold's longitudinal axis of symmetry, and/or each other.

When fixed attachment of the shape-defining subparts is to a mold base, the exterior or male surface of the mold may be used, and the mold thus configured and can accommodate virtually all the common modifications required within a particular style of board. Certain design features, however, such as bottom channels, nose concaves etc. can introduce enough compound curvature into the affected mold panel or rail component to reduce its bending capacity, and thereby limit its further use; these design features are therefore more economically accommodated by creating a one-off mold out of plastic foam. In an embodiment of the present invention, the convex configuration of the mold is reversed and plastic foam is molded in the concave cavity of a female shape-defining mold to produce a foam blank that, upon removal, can quickly have the desired features shaped into the foam by hand; the shaped blank then provides the convex shape-defining mold used to form the surface layer(s) that comprise the board's exterior skin. The foam is used as a mold and provides a shape-defining substrate that becomes part of the board structure itself—this eliminates adhesion problems and the high pressures generated by the expansion of the interior foam core when using the female molds of the prior art.

The mold system therefore produces shape-defining substrates—in the form of rapidly thermoformed exterior skin layer(s) or the quickly molded foam of the board's interior core—that can removed from the mold with the shape of the board substantially pre-defined; this speeds manufacture by dramatically reducing the time that the material is required to be in direct contact with the mold during production (e.g., either material can usually be molded or thermoformed in 2½ to 7½ minutes, depending on the type of foam and density of the thermoformed plastic). The rapid mold-cycle, and the fact that the shape-defining surface can become part of the board structure itself, reduces the high capital costs of the mold to a fraction of the prior art, and makes it possible to optimize the board's structural configuration for higher strength and lighter weight.

For example, because the perimeter rail occupies a relatively small area on the board, the thermoformed plastic foam skin core layer(s) forming the perimeter rail may have a density several times higher than the surrounding bottom surfaces and deck; because doubling the density of plastic foam will usually triple its compressive strength, the board can have very high impact resistance around the exposed perimeter edge, and lighter weight/higher strength, less conformable core materials such as end-grain balsa and honeycomb core (the cells of which are prone to rupture) can be used for the board's bottom and the less exposed surface of the deck. The pre-forming step also allows a bonding/reinforcing flange to be fabricated for extra strength along the exposed perimeter edge; the bonding-reinforcing flange may also provide a high-strength composite spar joining the board's right- and left-hand sides.

Other advantages include a more efficient use of space—the pre-formed substrates allow the board to be positioned with its width at right angles to the worktable—this dramatically reduces the manufacturing area required for production, and also makes it possible to use a mechanical fabric impregnator to quickly pre-saturate the fiberglass cloth. The fabric impregnator is used to best advantage when the board is molded in right and left halves—using the fabric impregnator, the reinforcing fabric can be quickly pre-saturated and draped over the board's exposed convex surface; wrinkles can be smoothed and the fiber aligned simply by pulling the fabric taut; and joint creation is stronger and simplified—the fabric can be quickly trimmed and overlapped to provide a protective covering on either side of the mid-section of the rail and the very sharp convex edge contours in the nose and tail as well. Equally important, with the board's width at right angles to the worktable, excess resin can be completely removed for higher strength and lighter weight—unobstructed, the resin quickly runs off the board's smooth vertical surface, leaving an absolute minimum within the fiber. A thin, plastic film/flexible female surface allows squeegee pressure to pass directly through to the laminate; vacuum may assist gravity and remove the rest.

The present invention allows the manufacturer reduce the proportion of the much weaker resin in the laminate from the sixty to seventy percent level (by weight, and typical of the prior art where the reinforcing fabric is saturated by hand) to the thirty-five percent range; this commonly doubles the flexural and compressive strength of the laminate in bending, and the weight saved can be used to increase the density of the stiff, lightweight sandwiched skin core; the higher strength of the skin, in turn, allows a reduction in the density and weight of material used for the board's interior core. The present invention thereby eliminates many of the drawbacks of using composite material in the prior art: a series of boards may be laminated in rapid succession and the optimum fiber/resin ration can be consistently attained in the skin; the present invention produces a board with an exceptionally high strength-to-weight ratio without resorting to the prohibitively expensive "pre-preg" composite materials of the prior art.

The present invention reduces or eliminates the serious structural problems and productivity constraints in prior art "one-off" and molded methods of manufacture: it reduces labor, the high capital costs of the mold, and the area required for construction to a fraction of the prior art. The versatility of the convex/concave mold configuration makes it possible for the board to be modified in shape, while allowing the materials and fabrication steps to be tailored according to manufacturing considerations or structural requirements of the board; in addition, certain foams may be molded directly in the concave cavity formed when the skin material is premolded in right and left halves. The structural advantages and manufacturing benefits outlined above will be more fully understood with the context provided by the detailed description of the invention, and upon viewing the drawings, which are provided as non-limiting examples and should in no way be interpreted as limiting the invention, which is defined more fully and accurately in the appended claims.

DETAILED DESCRIPTION OF THE INVENTION

Figure 1A:
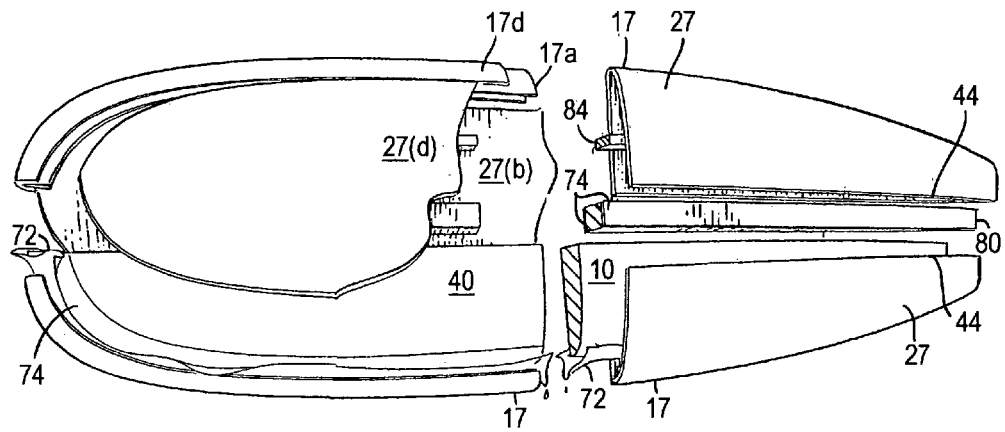
FIG. 1A is a side cutaway view, partially in perspective, depicting the top or deck surfaces of a board, and the general configuration of shape-adjustable substrates in the exterior skin and interior core.

The present invention discloses shape-adjustable skin and interior core structures that can be fabricated without the use of any concave shape-defining surface at all, and therefore without the high initial costs of constructing a prior art female mold, and the high manufacturing costs and structural problems caused by its subsequent use. As shown in FIG. 1A, the pre-formed perimeter rail 17 provides a continuous substrate that connects the broad, generally planar top and bottom surfaces of the board—molded separately, the perimeter rail 17 may be used as an adjustable template to cut the outline curvature in partially pre-fabricated skin core materials to create deck 27(d) and bottom 27(b) skin core panels, which may then be bonded to a shape-defining structural core 40; the shape-defining structural core 40, in turn, serves as a tool to apply composite laminate 72 for internal reinforcement in areas of the nose and tail where fingers, hands and application tools generally will not fit. The pre-formed skin core 27 can also be formed into a monocoque shell; the division at an axis of symmetry allows the width and planing area of the board to be adjusted according to where the centerline cut 44 is made; the continuous perimeter rail 17 also functions as a hinge so that the board's thickness and deck crown (i.e., the transverse curvature) can be modified with an internal shear web 84 and/or a longitudinal spar 80, or be determined by the shape-defining structural core 40, with each of the above surfaces becoming part of the board's interior core. As shown, the convex bonding/reinforcing flange 74 may be placed along the centerline of the board or at the board's perimeter edge or rail. The principles and materials used to modify the shape of the board structure can then be applied to the reusable mold itself.

Figure 1B:
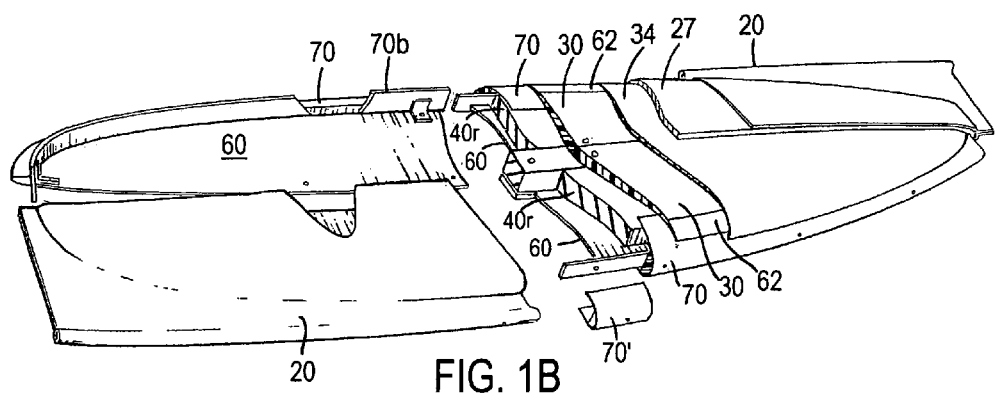
FIG. 1B is a perspective, cutaway view of shape-adjustable, convex/concave mold configurations used to create the substrates of FIG. 1A.

FIG. 1B is a composite view depicting various configurations of a shape-defining mold 10 which can produce the shape-adjustable substrates shown in FIG. 1A. The mold 10 may have an interior core made of impermeable, resilient foam 40r and incorporate an adjustable, interchangeable template 60 to position the perimeter rail 70 and modify the board's outline and width; added rail segments 70' permit changes in length at either end; the rocker strips 50r may be designed to attach to the template 60, the mold spar 80m, and to the deck 30 and rocker panels (not visible in this view) to change the lengthwise bottom curvature of the mold 10; the mold may also be modified so the longitudinal profile may also be set to the pre-fabricated spar 80 shown in FIG. 1A. Thickness changes may be accomplished using male spacers 34 of molded rubber or synthetic plastic foam (depicted in this view directly beneath the molded skin core 27 and the female component 20). Either surface (27, 20), or a layer of molded silicone rubber (not shown), may be used as (male) spacer(s) to mold a thermoplastic material or conventional fiber-reinforced tooling plastics to create a female mold 20, which can be used to mold plastic foam, or to impart a smooth surface in the board's exterior skin; the mold 20 depicted in this view incorporates a molded hinge along one perimeter edge which will allow attachment to mold base 12 (depicted in FIG. 2B below) in order to mold a foam shape-defining mold or structural core 10/40; the circular, hollow shape of the hinge also allows a source of vacuum to be applied and permits the entry and removal of resin in the laminating process.

The principles outlined above are completely interchangeable between the mold and the board structure itself; board production however, commonly starts with the construction of a mold. The following discussion therefore begins with a general description of the mold's construction, basic configuration and design, followed by an outline of novel shape-adjustable thermoplastic skin structures and molds, and concludes with a general description of methods and materials useful to complete the board.

For purposes of clarity, the drawings typically illustrate only one half of the symmetrical board/mold; the deck or top surface is facing the viewer and the nose is oriented to the left. Composite views are also shown, and depict various skin and interior core combinations. The reference numeral 10 denotes the shape-defining mold and individual shape-defining subparts as a whole; like reference numerals are used to denote both right, left, male and female mold subparts; the numbering does not necessarily indicate the mold/subpart's dual nature, since it may perform a shape-defining function, then become part of the board structure itself.

1. Construction of the Mold

In the present invention, a rigid shape-defining component is used to define the exterior shape of the board; after the exterior shape of the board is pre-defined, an optional conformable female component may be used to impart a smooth surface the board's exterior skin. Construction of the shape-defining mold may be from any of the fiber-reinforced tooling plastics, and may also include materials such as metal, plaster, rubber, foam rubber etc. useful in the mold-making arts; the mold may further include synthetic plastic foam which becomes part of the board structure itself. The shape-defining component may be made from solid material; it may have a single division with functional convex (male) and concave (female) surfaces; it can have a single surface or comprise a plurality of individual surfaces, subparts or pieces.

Construction of fiber-reinforced, high-heat compatible tooling epoxy composite allows the fiber to be aligned to better accommodate an anticipated modified curvature or bend, and facilitates the incorporation of different materials into the structure of the mold—for example, metal may be added to increase heat transfer, stiffen specific areas, and reinforce apertures for fastening devices, etc. The tooling composite may also be used with an elastomeric acrylic or silicone based rubber for a variety of purposes, including the creation of tapered, flexible fairings between individual moveable mold surfaces or subparts.

The shape-defining component may be used with a separate conformable female mold component that, when used primarily to impart a smooth surface in the board's exterior skin, may be formed from thin, inexpensive sheets of ABS (acrylonitrile-butadiene-styrene), PC (polycarbonate), PP (polypropylene) PMMA (polymethylmethacrylate), etc. using vacuum-thermoforming techniques and, when appropriate, subsequently trimmed in the same manner as the thermoplastic foam skin material of the board described in greater detail below. The female component may also be constructed of flexible, elastomeric silicone or acrylic rubber to allow it to conform to a variety of shapes; fiberglass may be used to create a silicone/fiberglass composite; the mold may incorporate a thin layer of plastic tooling composite to stiffen the broad, planar top and bottom surfaces of the mold, and leave the elongation of pure rubber at the rail to conform to the convex radius at the board's perimeter.

The female surface may also perform a shape-defining function, either in the molding of plastic foam or in the positioning of skin material as the composite laminate hardens and cures. Because either surface can quickly produce a convex substrate (e.g., expanded plastic foam, or sheet material(s) that serve as layer(s) in the skin), and the substrate can be used either as a shape-defining mold or to define the shape of fiber-reinforced plastic as it hardens and cures, male or female molds can be used to produce the board from start to finish.

2. Basic Mold Configurations and Design

Figure 2A:
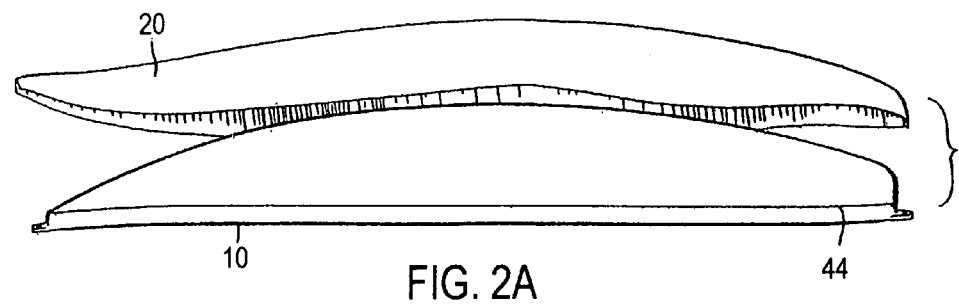
FIG. 2A is a side view of a right-hand mold half, according to an embodiment of this invention.

When the reproduction of a popular stock board shape is a primary consideration, the mold may be constructed as shown in FIG. 2A, which gives a side view of the two basic components of one right-hand mold half. As depicted, the width of the shape-defining component 10 is oriented vertically, the top and bottom sides are normal to a worktable (not shown); the thin, flexible female component 20 is shown being fitted over the shape-defining mold 10; the scribed line 44 represents a hypothetical longitudinal centerline of a molded skin core 27 (not shown in this view) of a right-hand board half. As depicted, the shape-defining component 10 may be solid; each half may also have a single continuous surface with functional interior (female) and exterior (male) surfaces. The mold halves depicted do not meet precisely at a predetermined point—this makes the mold much less expensive to construct, and also allows substantial alteration in shape. The board's width and planing area, for example, can be adjusted according to where the centerline cut 44 is made; the tail can be made wider relative to the nose and vice-versa; the mold's surface can be adapted to incorporate inexpensive subparts (not shown) made from elastomeric rubber or sheet foam to produce nose concaves, bottom concaves or channels; the volume can be modified depending on whether the interior or the exterior of the shape-defining mold 10 is used as the shape-determining surface; precise gradations may be made by bonding the molded exterior skin core 27 to the shape and longitudinal profile provided by material used in the board's interior core. In the present invention, a mold made for a single, popular stock shape can produce the width, volume and planing area modifications needed to tailor the board to a wide range of individual flotation and performance requirements.

Figure 2B:
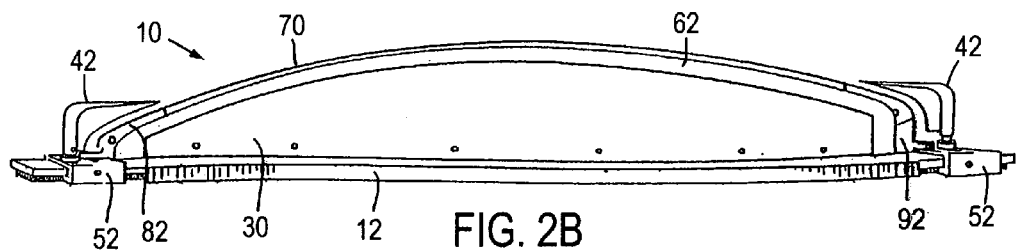
FIG. 2B depicts a right-hand mold half comprising individual, shape-adjustable mold subparts assembled to are assembled to a mold base.

Turning now to FIG. 2B, the right-hand half of a shape-defining mold 10 is depicted with separate shape-defining mold subparts assembled to a mold base 12; during assembly, fixed attachment of the subparts to the mold base 12 allows the length, rocker curvature and thickness of the shape-defining mold 10 to be adjusted as the separate shape-defining subparts are attached.

Figure 2C:
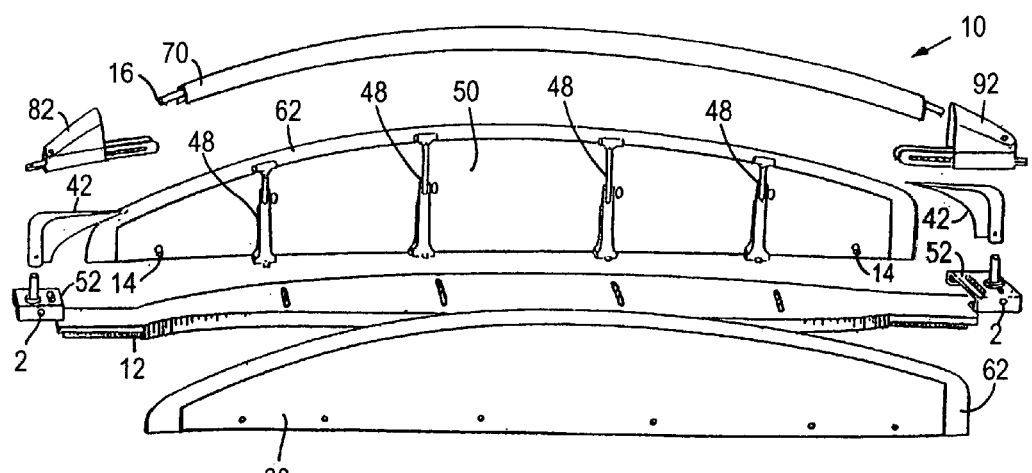
FIG. 2C is an exploded view of the right-hand mold half of FIG. 2B.

FIG. 2C, an exploded view of the mold of FIG. 2B, provides an illustration of the basic individual subparts; as illustrated, the perimeter rail part 70 is depicted directly above the bottom rocker panel 50; opposite the rocker panel 50 is the deck panel 30; both are shown at right angles to a mold base 12 that, in this example, provides an external reference surface that allows the curvature of the rocker panel 50, and/or the other subparts to be adjusted as they are attached. In the present example, the deck 30 and rocker 50 panels have a complement of transverse (wherein transverse is normal to a longitudinal axis of symmetry of the mold) stiffeners 48 on the respective interior panel sides (30, 50), visible in this view only on the rocker panel 50.

The deck 30 and rocker 50 panels may be attached by bolt or similar fastening device to the base of the transverse stiffeners 48; the base area of the transverse stiffeners 48 may be provided with an adjustment mechanism that controls the distance of the deck 30 and rocker 50 panels from each other, thereby allowing the thickness of the eventual board to be measured as it is set. In this example, the upper part of the transverse stiffeners 48 have sliding rods 24 that attach directly to the fiberglass rod 16 on the inside of the perimeter rail 70, to allow movement and the fixed setting of the position of the rail 70 to modify the board's outline and width. In this example, the structural skeleton of the perimeter rail 70 comprises an articulated rib/backbone arrangement made of molded tooling epoxy composite. The ribs, created by razor cut through the laminate before the resin has fully set, may be imbedded in molded rubber for a smooth surface skin; with the molded ribs attached to a fiberglass or carbon-fiber rod 16 that functions as a backbone, the articulated skeletal structure of the perimeter rail 70 allows it to flex lengthwise to accommodate different rocker curvatures in the mold; it can adjusted to different widths or thicknesses, and describe different outline curvatures as well.

To incorporate changes in length, molded nose 82 and tail blocks 92 may be designed so that they slide fore and aft on a protruding bolt 14, with the position secured by tightening a knurled nut (not shown). In this example, the nose and tail components (82, 92) incorporate optional exterior edge or rail pieces designed to rotate on a hinged pin so as to accommodate the changing outline shape of the perimeter rail 70 as they slide fore and aft. The rocker curvature of the nose 82 and tail 92 components (which continues the bottom curvature of the rocker panel 50) of the shape-defining mold 10 may be adjusted when the nose 82 and tail 92 components are attached to the moveable rocker plates 52 provided at either end of the mold base 12. The rocker plates 52 may be designed to provide movement in two different directions to modify the mold's rocker and length. In the example shown, the fore and aft movement of the rocker plates 52 on the mold base 12 allows the length to be adjusted by tightening an Allen screw 2; the rocker, in turn, may be modified using a moveable threaded nut (not shown) captured in an internal channel or slideway in the rocker plate 52 (not shown) so that the nose 82 and tail 92 components can be moved to the desired rocker curvature, and their position then secured by tightening a set-screw (not shown), for example. The edges of the subparts may be very finely tapered to reduce the ridge or gap between the separate surfaces to minimize the transfer or print-through of minor imperfections on the mold to the surface of the board. This may be accomplished all or in part with a second female mold 20 (not shown in this view) made from molded silicone rubber, for example, or a flexible rubber fairing 62, which is depicted in this example running the length of both panels 30 and 50, but which may be utilized between any two movable subparts of a shape-defining mold 10 constructed according to the principles of the present invention.

Figure 3A:
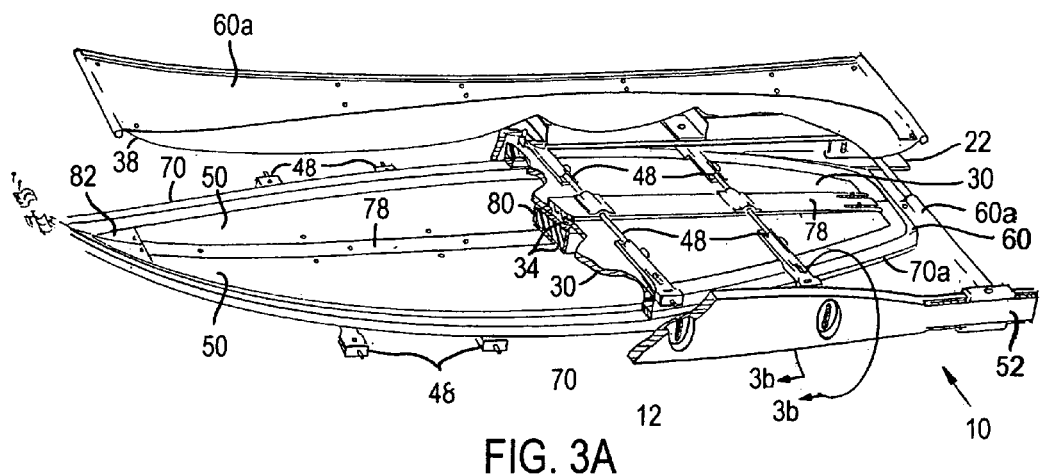
FIG. 3A is a perspective, cutaway view of the subparts assembled to create a female mold divided into top and bottom halves

In FIG. 3A, the transverse stiffeners 48 are depicted in a horizontal position, which allows the creation of a female mold divided into top and bottom halves. In the example shown, the deck and rocker panels (30, 50) attach to a center joining flange 78, the sliding rods 24 run through the center joining flange 78, and the base of the transverse stiffeners 48 attach to a mold base 12, external frame 22, or an equivalent external reference or positioning structure. The external positioning devices (12,22 or equivalents) may also be divided into upper and lower parts (not depicted) to facilitate setting the lengthwise curvatures of the deck and rocker panels (30, 50); the rocker curvature may also be set using a template (not shown) or, as illustrated, by using an interior spar/shear web 80 and spacers (not shown) corresponding to the thickness of the eventual skin structure. Bottom channels, bottom concaves, etc. may be produced by temporarily positioning or affixing a subpart in the form of a molded rubber or synthetic plastic foam "blanket" having the desired features (not shown, but similar to the male spacer 34 shown in FIG. 1B) to the female surface of the rocker panel 50 prior to molding.

The perimeter rail may be set by a variety of devices, including a template 60a; the template may incorporate a layer of material 38 that can be attached to the exterior (male surface) of the deck or rocker panels (30, 50) to create an airtight barrier so that air can be evacuated from the female surface of the mold in a vacuum thermoforming process. To accommodate thickness changes, the perimeter rail 70 may be one-piece and its curvature may enclose a smaller area (not shown); the rail 70 may also be divided into upper and lower parts at the point of greatest breadth and be provided with the rail spacer 70a, which is shown in greater detail in the cross-section taken along lines 3b-3b depicted in FIG. 3B. Skin material, such as a skin core 27 of high-density thermoplastic foam, can then be molded oversize and trimmed to shape using the profile (and a marking device with a suitable extension) of the pre-fabricated spar 80. In the thermoforming procedure, a pre-formed backup rail piece 17a may be created; after the spacer 70a is removed, the skin core 27 may be evenly cut to match the edge of the perimeter rail 70. The trimmed foam 36 may then be temporarily reattached and, with the additional rail piece 17a pinned to the bottom skin core and acting as support, the deck skin core 27(d) may be brought down over the bottom skin core 27(b); the trimmed rail piece 36 may then be pinned through so it attaches to the deck skin so as to accurately mark the position where the two sides will subsequently meet. Prior to applying the laminate, the trimmed foam 36 piece(s) may be taped and temporarily reattached and serve to mold a curved shape into the laminate at the perimeter rail, which may be razor-trimmed after the laminate gels and has taken an initial set to create the overlapping, interlocking rail configuration shown; the backup perimeter rail piece 17a may also have laminate 72 applied and provide a source of outward pressure as the two halves are joined; the exterior surface of the backup rail piece 17a then forms part of a convex bonding/reinforcing flange 74 for an extremely strong, lightweight double sandwich rail.

Figure 3B:
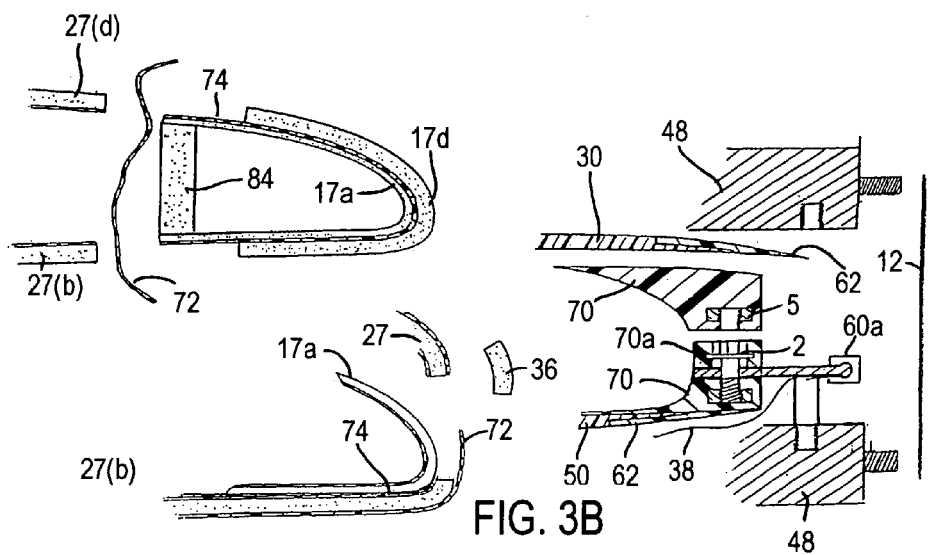
FIG. 3B is a cross-sectional view taken along lines 3b-3b of FIG. 3A.

Alternatively, the rail piece 17a may be replaced with a backup surface of impermeable resilient foam 40r (not shown) performing the same function; two pre-formed skin core layers may also be used with a shear web 84 to create the double thickness rail 17d shown in the upper part of FIG. 3B; either surface may be used to create a convex bonding/reinforcing flange 74 and serve as very high strength joint due to the internal reinforcement provided between the board's opposing sides. As shown, the double thickness rail piece 17d, if molded slightly oversize, may be inserted between the skin core layers 27(b,d) and the two sides of the board may be compressed (e.g., by the deck 30 and rocker panels 50 of the mold shown in FIG. 3A) to the thickness of a shear web 84 or longitudinal spar 80; the composite layer(s) 72 may then be used to create (or complete) a sandwich structure in the shear web 84 joining the two opposing sides, with the shear web 84 forming an integral part of the high strength bonding/reinforcing flange 74 at the perimeter of the board; each of the above surfaces (i.e., 17a, 17d or 40r) may also provide a source of outward pressure useful in the bonding process. In addition, the rail or perimeter edge area can be very neatly trimmed so that clear or tinted resins can be used in the laminate for a variety of color combinations and a more attractive overall appearance.

Together, the configurations of the shape-defining mold 10 outlined above can accommodate nearly all the common modifications required within a particular style of board. Certain design modifications, however, such as bottom channels, nose concaves etc., may introduce sufficient compound curvature into the affected subpart to reduce its capacity to bend, and thereby limit its future use. The above design features may therefore be more economically accommodated by creating a one-off mold out of plastic foam, using the internal cavity of the female component 20 depicted in FIG. 1B or 2A, for example, to produce a foam blank that, upon removal, may have the desired design modifications shaped into the foam by hand; the foam blank may then be used as a male mold or form to define the shape of the exterior skin of the board in the same manner as a male configured shape-defining mold 10 of the present invention.

In the molding of the foam, the female cavity of a shape-defining mold 10 may also be used; both molds (10/20) may be used in conjunction with each other or separately; the female mold 20, when made of thermoplastic material, may also become part of the finished board. The molded foam may comprise a two-part polyurethane formulation known in the prior custom board-making arts; common procedures in the molding of which include heating the mold and pre-foam to a uniform temperature; for easier removal the foam may be allowed to rise parallel to the mold's width. The production process may also be designed from the outset to create a foam shape-defining mold 10 which becomes part of the finished board; modifications may also be made to the female cavity of a shape-defining mold 10 to allow the molding of bead foams (e.g. EPS, EPP, etc.) expanded by exposure to steam, and for the foam to be molded in a shape-defining mold 10 having a modifiable internal cavity.

Figure 3C:
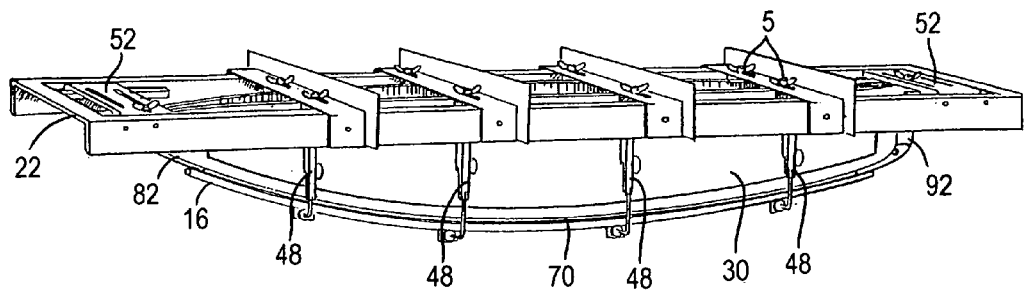
FIG. 3C is a view of the left-hand side of a shape-defining mold in a female configuration.

In the present invention, a right- and left-hand shape-defining mold 10 having a modifiable internal cavity may be created simply by reversing the base of the transverse stiffeners 48 to an upright position and, as depicted in FIG. 3C, attaching the transverse stiffeners 48 to the exterior of the deck 30 and rocker panel 50, to the underside of the frame 22, and to the externally positioned fiberglass rod 16 on the exterior of the perimeter rail 70.

Figure 4A:
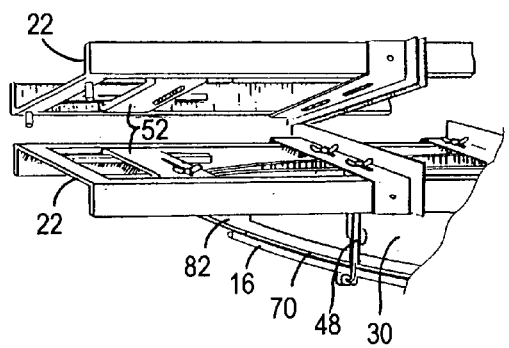
FIG. 4A depicts a frame design that facilitates matching opposite sides.

To ensure an accurate match between the opposing sides, the frame 22 may be designed so that both sides of the frame 22 fit precisely together, as shown in FIG. 4A; the base of the transverse stiffeners 48 may also be fitted with washers 8a having locating pin(s) designed to fit into matching aperture(s) on the base of the transverse stiffener 48 on the opposite side (described in greater detail below). The transverse stiffeners may also be attached to a frame 22 to provide a jig fixture or "rocker table," such as the example depicted in FIG. 4B. The rocker table 18 may be designed to hold the template 60, the spar 80, or any of the mold subparts or shape-adjustable substrates used in the construction of the board; the rocker table 18 may also be vented and be in fluid communication with a source of vacuum pressure VP such as a vacuum pump in order to first hold, and then mold the various parts of the board/mold (e.g., the rail parts 17/70 as shown) in the fabrication process (as described more detail below). The rocker table 18 may also be designed to replace the rocker panel 50 of a mold configured in top and bottom halves, such as the example depicted in FIG. 3A, so that male and female mold configurations can be used in the vacuum-thermoforming process. A more detailed view of the design of the transverse stiffeners 48 is provided in FIGS. 5A, 5B, and 5C.

Figure 5A:
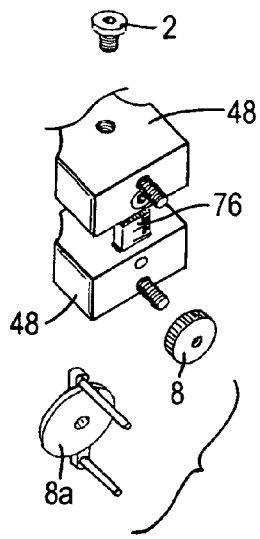
FIG. 5A is a partial view of the base area of two transverse stiffeners.

The partial view in FIG. 5A shows the base area of two transverse stiffeners 48 and depicts an Allen screw 2 that may be utilized to attach the deck 30 and rocker 50 panels, and a knurled nut 8 that, in this example, is used to attach the respective transverse stiffeners 48 to the mold base 12. The base may be provided with a measuring device 76 that also serves as an adjustment mechanism; positioning devices, such as the washer 8a may be designed with locating pins made to fit into positioning apertures in the bottom of the transverse stiffeners 48 on the opposite side of the mold (not shown).

Figure 5B:
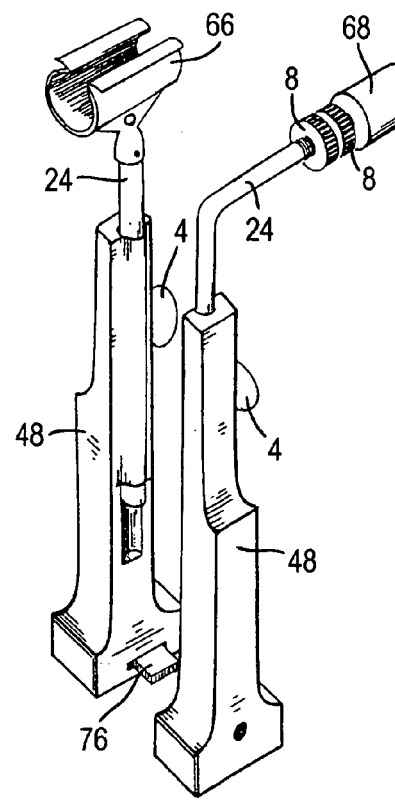
FIG. 5B is a perspective view of two transverse stiffeners in an upright position, its usual attitude in the interior of a male configured mold.
Figure 5C:
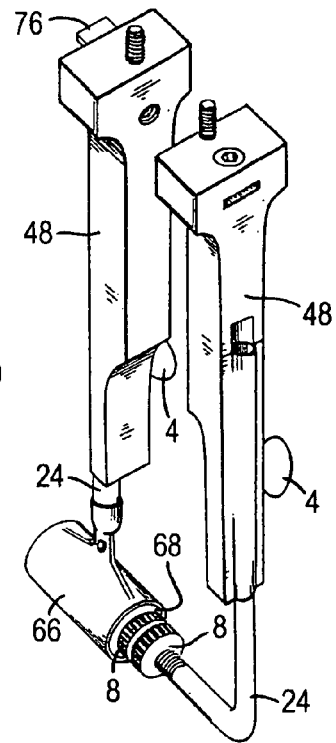
FIG. 5C is a perspective view of two transverse stiffeners in the reversed orientation used to create a female mold in right and left halves.

FIG. 5B shows the transverse stiffeners 48 in an upright position, which corresponds to their position when they are transversely oriented to the mold's width in the interior of a male configured shape defining mold 10, as depicted in FIG. 2C, for example. The attach point 66 is designed to hold the fiberglass rod 16 on the interior of the rail 70, while the movement of the adjustable rod 24 modifies the position of the perimeter rail 70 to adjust the board's outline and width; the position of the adjustable rod is set tightening the wing screw 4. to adjust the board's outline and width. FIG. 5C depicts the transverse stiffeners 48 in the reversed position matching that of the mold shown in FIG. 3A—the transverse stiffeners 48 are shown with their base area facing up, so as to allow attachment to the external frame 22 and to the exterior of the deck and rocker panels (30, 50); the adjustable bars 24 are rotated so the rubber bushing 68 fits into the attach point 66; the two knurled nuts 8 tighten to the attach points on the fiberglass rod 16 on the exterior of the rail 70, and thereby allow the position of the rail to be secured. The fastening devices suggested herein are not presented in a limiting manner, but may be replaced with any number of mechanical fasteners having an equivalent function; other devices, such as spring clips, cam locks, worm gears, and similar fastening, locking and adjustment mechanisms may be employed, and may perform functions not specifically described herein. In addition, fastening and adjustment devices may be added or omitted, and may perform functions such as modifying the board's transverse deck crown, or the "vee" or "belly" in the bottom of the board. Similarly, mold configurations and sub-parts may be combined, interchanged, and embody modifications not specifically described herein, or employ shape-defining parts that are made from materials that become part of the finished board structure itself.

In the present invention, the productivity of the mold is enhanced by its capacity to produce a plurality of different shapes, and by the rapid mold cycle of quickly formed thermoplastic sheet material; the thermoformed sheet material can function as a skin core substrate, or be used as the outermost layer in the skin; it may also be used in the molding of foam or fiber-reinforced plastic. After use as a mold, heating the thermoplastic material to a deformation temperature will cause it to return to its original shape, which will allow polishing, reconditioning etc. and subsequent reuse. This second inexpensive mold creation/reuse cycle is especially useful in creating small concave molds 20a (not shown, but described in more detail below) for use in localized areas; further, because the female surface is conformable to the shape of the foam rather than vice-versa, very high pressure can be applied to the laminate to force excess resin from the fiber for higher strength and lighter weight. The small concave molds may be used to mold smooth high-strength structural layers to create longitudinal spar caps, which may also double as internal reinforcement for bondline(s) in the board's exterior skin, or to pre-mold composite layers to provide internal reinforcement for areas subject to high impact (e.g., the perimeter rail, nose and tail), where space is constricted and fingers, hands and application tools will not readily fit. The small conformable concave mold may also be made from tooling composite, elastomeric rubber, etc.; the smooth foam-backed structural layers, molded by either component (20/20a) directly to a foam shape-defining mold 10, create the foam shape-defining structural core 40 pictured in FIG. 1A, either or any part of which may then be used to define the shape of board in the molding of the exterior layer(s) of the board's skin. In the present invention, for example, the board's exterior skin may be formed from thermoplastic sheet material in a single, one-step molding process, as described in more detail below.

3. Vacuum Thermoformed Molds/Shape-Adjustable Skin Cores

In the present invention, the principles that allow the mold to be modified in shape may be applied with equal success to the board structure itself—the deck, bottom (rocker), and rail of the pre-molded skin core layer provide shape-adjustable substrates that can be accurately trimmed, routed and/or sanded to the desired dimensions; the substrates can then be bonded to one another and/or to the interior core to produce the final, permanent shape. A layer of rapidly thermoformed plastic may also be used as a female mold for the expanded foam plastic of the board's interior core, and a thermoformed plastic can provide the outermost layer(s) of the board's exterior skin.

In a method of this invention, therefore, heat and pressure may be used to thermoform two chemically similar but physically different materials (i.e., sheets of pure plastic and plastic foam) to form the board's exterior skin. The thermoforming of sheets of plastic having an acrylic, polycarbonate etc. base is widely known and used successfully to mold an array of items ranging from aircraft canopies to food containers—in the thermoforming process, a well insulated chamber such as an oven or a heated pressure vessel (e.g. an autoclave) is often used; heat may be supplied by conventional electrical heating elements, high-heat transfer fluids (e.g. propylene glycol or the like), heat blankets etc.; pressure may also be provided by a two part mold press, fluid or gas filled bladders or similar molding devices. In a vacuum thermoforming process, atmospheric pressure is used: the thermoplastic sheet is usually clamped to a frame, heated to a deformation temperature, and moved into contact with the mold and, with the frame creating an airtight seal, vacuum is applied—the withdrawal of air causes the pressure of the atmosphere to press on the exterior of the heated sheet, and conforms the thermoplastic material to the shape of the mold. In the present invention, vacuum may be drawn through or around the mold; the frame may also be flexible and match the rocker curvature of the adjustable shape-defining mold 10 or the rocker table 18, for example.

Figure 6A:
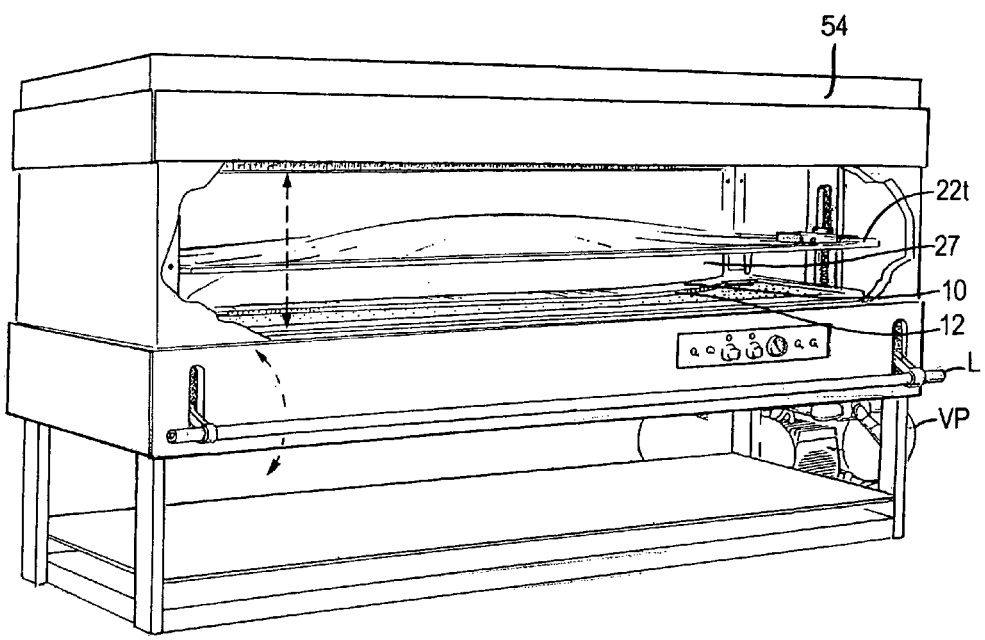
FIG. 6A is a cutaway view of an oven that may be used in the thermoforming of thermoplastic skin core material and molds.

FIG. 6A is a cutaway view of an insulated chamber such as an oven 54, and provide a non-limiting example of a thermoforming process, in which a frame 22t containing the thermoplastic sheet material is raised by a lever into close proximity to the heating elements in the upper portion of the oven; when the thermoplastic sheet reaches a deformation temperature, the frame 22t is drawn down over the shape-defining mold 10, where it contacts the perforated platen on the bottom of the mold base 12 and makes an airtight seal; the perforated platen is in fluid communication with a vacuum pump VP to allow vacuum to be drawn; with the withdrawal of air, the pressure of the atmosphere presses on the exterior of the heated thermoplastic sheet and conforms it to the shape of the mold 10.

To avoid excessive stretching or (cooling) contraction of the material in the thermoforming process, the thermoplastic sheet may be attached to a second layer of material that is held within the frame, rather than the frame itself; the thermoplastic sheet may also be vacuumed between layers of sheet material such as high-elongation release film or vacuum-bag material that can be held to the frame and formed for use in subsequent steps of production. Sheet silicone rubber may also by used for an airtight barrier within the frame; the thermoplastic sheet may also be held by clamps bonded to an elastomeric rubber that is then attached to the frame so that the rubber, rather than the sheet, will stretch during the forming process. This is particularly advantageous using certain types of thermoplastic sheet foam, which will conform to gradual curvature—such as the shape of the board divided into top and bottom halves—but may break or separate when attached directly to a frame because of a limited capacity to stretch during the thermoforming process.

Figure 6B:
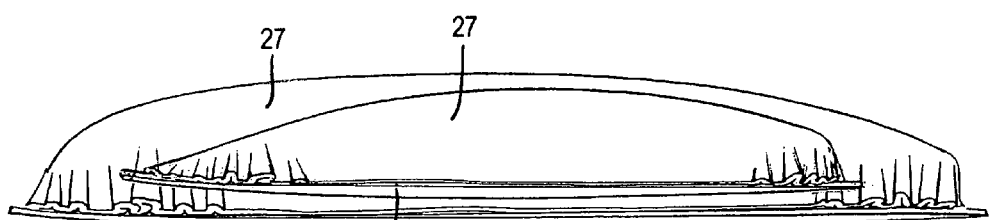
FIG. 6B is a side view showing a "longboard" and short surfboard with folds and wrinkles in the thermoformed skin caused by the excessive compound curvature around the board's perimeter edge.
Figure 6C:
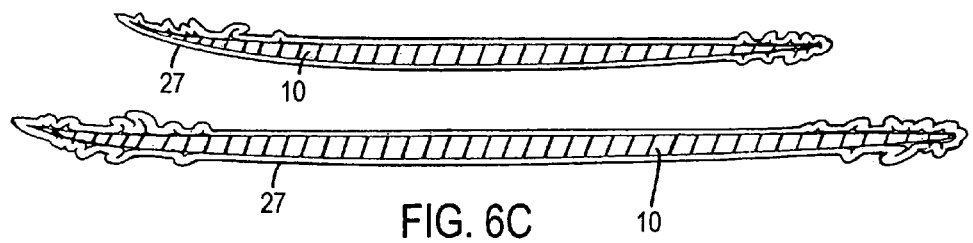
FIG. 6C is a longitudinal profile view depicting the wrinkles in the nose and tail areas of the two boards depicted in FIG. 6B.

In the present invention, the most rapid method of production is to thermoform a layer of high-density plastic foam into a thin, continuous monocoque shell in the shape of one right- or left-hand side of the board. The difficulty molding the board in right in left halves is the excessive compound curvature around the perimeter of the board. As can be seen in FIG. 6B, which depicts a short surfboard roughly six and a half feet long in front of a modern "longboard" 9' in length, the board's outline is as much as ten percent longer than the measurement lengthwise at the center, while the lengthwise rocker curvature causes a length differential between the board's top and bottom sides. As depicted in FIG. 6B and the profile view of FIG. 6C, the foam's limited capacity to stretch and particularly to compress in the thermoforming process causes the thermoplastic foam skin core 27 to fold in large uncontrollable wrinkles, instead of conforming to the exaggerated compound curvature at either end.

Figure 7A:
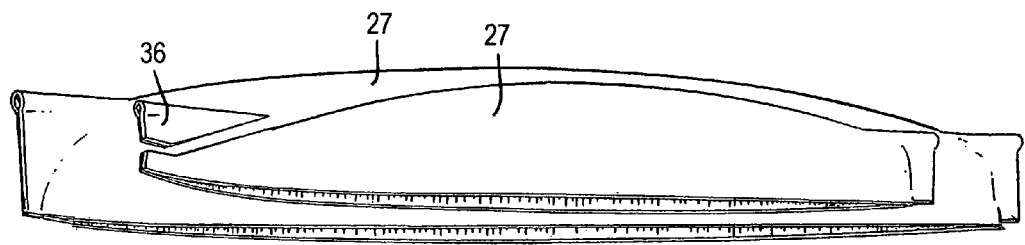
FIG. 7A is a side view, partially in perspective, of the boards in FIG. 6B with a thermoplastic skin molded with a mold extension.

In the present invention, these wrinkles are prevented by the rectangular mold extension 42 depicted in FIG. 2A. The mold extensions 42 at the nose and tail of the shape-defining mold 10 make the outline and centerline dimensions more equal, and dramatically reduce the amount of curvature at either end. As shown in FIG. 7A, the mold extension 42 allows the thermoformed skin core 27 to fold smoothly over the entire perimeter of the board in a single continuous piece—the area actually formed is the much milder compound curvature along the midsection of the board or rail.

Figure 7B:
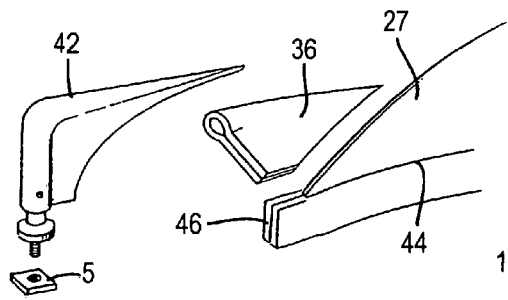
FIG. 7B is a partial view of the nose area after thermoforming a high-density foam skin core with a mold extension.

FIG. 7B provides a closer view of a mold extension 42 and shows a threaded nut 5, normally captured in an internal channel in the rocker plate 52 (not shown), and provides a more detailed, partial view of an example a molded foam skin core 27 removed from the shape-defining mold 10 after forming; the trimmed foam 36 shows how the foam folds smoothly over the upper portion of the extension 42, makes the sharp bend at the mold's perimeter rail 70, then conforms to the top and bottom surfaces of the mold. As depicted, the molded skin core 27 ends slightly beyond the eventual centerline 44 of the board.

After forming, the folded foam area 36 may be removed with a razor; sanding will fair in the surface and will restore the board's sharp trailing edge contours at the tail (which may be substantially reduced in the thermoforming process). In the present example a small tab 46 is depicted; the tab is created during the trimming of the molded skin core 27 to allow the sides of the skin core to be spread so as to avoid contact with saturated reinforcing fabric in the laminating step is (which is described in greater detail below); it also allows changes to be made in the rocker curvature of the board and provides an area that can be clamped so that the two sides of the molded skin core 27 are bonded together again during lamination.

Figure 7C:
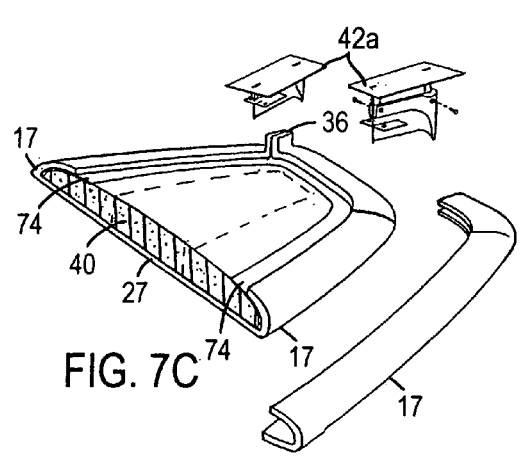
FIG. 7C is a perspective, cutaway view of the tail area of the board depicting smaller mold extensions used in the tail area of the rail.

Alternatively, the skin core 27 may be molded as depicted in FIG. 7C, which depicts a much smaller mold extension 42a that will prevent wrinkling at either corner of the tail area when the thermoplastic skin is molded around the bottom of a shape-defining structural core 40 creating a pre-formed perimeter rail 17 having a division between the board's top and bottom sides; additional mold extension(s) 42a at the nose (not shown) allow the skin core of the rail 17 to be molded in right and left sides, and have a continuous surface with the deck or bottom surfaces of the board. As illustrated, the mold extension 42a is designed to be inserted directly into a foam core and is two-part; the flat upper area may be attached to a rocker table (18, not depicted in this view) and provide additional stability for the shape-defining structural core 40 (or foam mold 10, not shown) as the deck rests on nesting material (not shown) on a rocker table 18 (not shown in this view) during the thermoforming process. The foam in the shape-defining structural core 40 may be pre-scored with appropriate knife cuts so as to allow removal and re-insertion for bonding, the application of laminate, or to create internal bonding/reinforcing flanges etc. in subsequent steps of production.

Figure 4B:
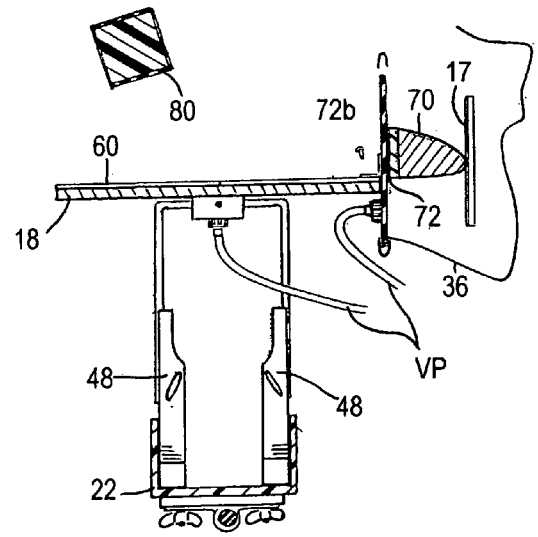
FIG. 4B is a view, partially in cross-section, of a jig-fixture or "rocker table."

The perimeter rail 17 of the board is also shown molded separately which, in the present invention, may be accomplished on a shape-defining mold 10 or by using the separate, flexible rail subpart 70 with a jig-fixture or rocker table 18 such as that shown in FIG. 4B. The rail mold 70, when constructed from foam, resilient foam, silicone rubber etc., may be placed on a tooling composite base 70b; a pre-cured composite layer 72 having the desired rocker curvature already traced on it (using the template 60) may then be positioned on the rail base 70b so as to allow the perimeter rail 70 to be matched to the rocker curvature of the board; the rail 70 and thermoplastic layer(s) may then be covered with a heat blanket and heated to a deformation temperature; as the vacuum is drawn, the flexibility of the pre-cured composite layer 72 will allow the assembly to be conformed to the outline curvature of the template 60 (shown in perspective in FIG. 1B) at the tail, so that after cooling, the thermoformed rail 17 will have the desired lengthwise rocker curvature and outline shape.

Figure 8A:
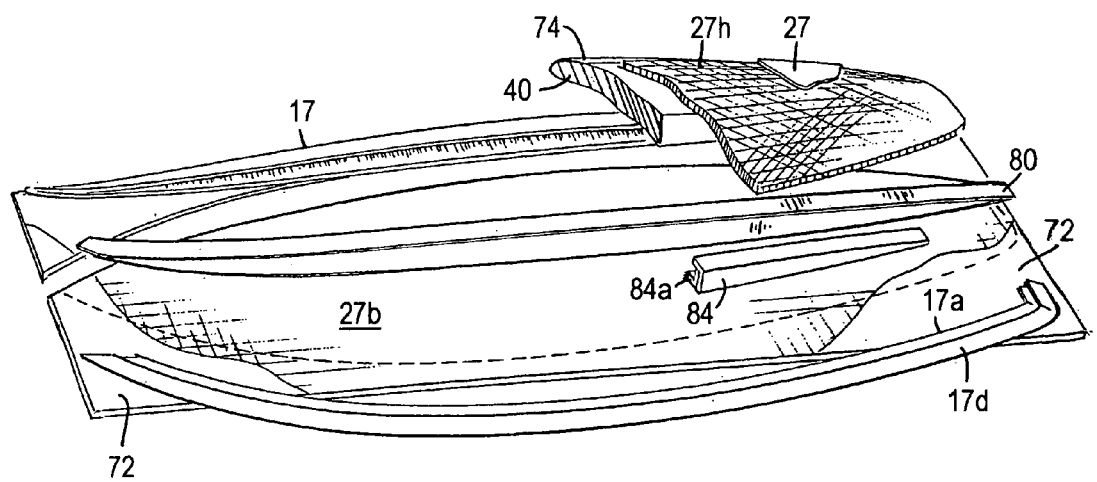
FIG. 8A is a perspective, cutaway view of high-strength, shape-adjustable skin substrates that can be fabricated using convex shape-defining surfaces that become part of the board structure itself.

Referring now to FIG. 8A, the pre-formed thermoplastic rail 17 can be joined to sheet core material (27b, 27h) and a shape-defining foam core 40 or, using the same process outlined above, made with a second layer of high-density plastic foam 17a to create double thickness rail 17d, which can then be combined with partially pre-fabricated sheet core material—i.e., core material (27b, 27h) that has an (interior) layer of composite laminate 72 already applied and cured to one side—with only half the sandwich structure complete, the core material can still be easily bent in the direction of the side lacking the cured, high-strength composite facing, and can be bonded to the lengthwise deck and rocker curvatures of a longitudinal shear web 84 and spar 80, or a shape-defining foam mold/structural core 40; the pre-formed rail 17/17d can also serve as a template to cut the outline curvature in the board's deck 27h and bottom panels 27b before bonding the material to the interior core. As shown, the longitudinal shear webs 84 may be thermoformed to the longitudinal profile of the spar 80 to create an adjustable, channeled foam base area and a two-part interlocking structure (84/84a); glue may be applied to both surfaces and then pinned to adjust the deck crown or thickness towards the perimeter of the board (as shown in FIG. 17A). The double thickness rail 17d, with high-strength structural layer(s) 74 applied to at least the convex surface of the interior layer 17a, can then be inserted between the deck and rocker panels to provide the perimeter edge, with high-strength facing material completing the structural exterior skin.

Because it occupies a very small area on the board, the pre-molded rail can made from very high-density core material for improved impact resistance around the board's perimeter edge; it can also be combined with core materials having a higher strength-to-weight ratio—e.g., end-grain balsa or Nomex® honeycomb core—which will generally not conform to the very sharp contours along the board's trailing edge and tail. For example, end-grain balsa 27b may be used for the board's flat bottom; more conformable honeycomb core 27*h*, the cells of which are prone to rupture, may used on the less exposed area of the deck; the cells may also be protected by additional layer(s) such as wood veneer or, as shown, a very thin layer of high-density plastic foam 27 etc.

Figure 8B:
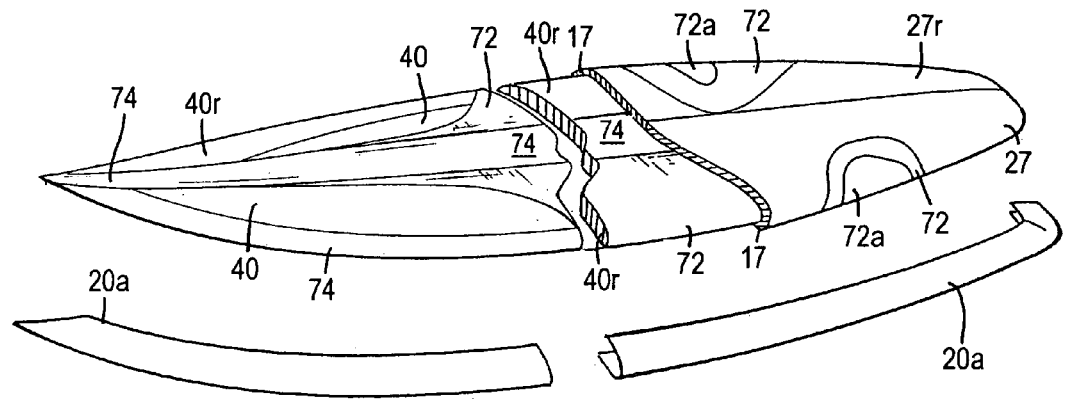
FIG. 8B is a perspective, cutaway view depicting convex shape-defining structural cores with high-strength structural layers providing convex bonding/reinforcing flanges beneath the board's exterior skin.

Referring now to the composite, cutaway view of FIG. 8B, the small, conformable female component 20*a* may be used to mold structural composite layers 74 to create the foam shape-defining structural core 40; the structural layers can provide internal reinforcement in high-impact areas at the perimeter rail, and can also serve as a bonding or reinforcing flange 74 between the board's two opposing sides. Because the bonding/reinforcing flange 74 shown in the center of the board may eventually be hidden beneath the skin, it can function as a spar cap whose width and depth can be increased with multiple layers molded towards the center of the board, so as to allow the board to withstand much higher bending loads without damage; as depicted, layers 72 may also be continued around the perimeter for higher shear strength in bending. The concave conformable female components 20/20*a* allow high squeegee pressure to remove excess resin from the laminate—the very high strength that can be developed in the spar then allows resilient foam to be used in the structural exterior skin 27*r* or interior core 40*r* to better absorb high-impact loads without damage; lighter, thicker skin materials, such as thermoformed plastic sheets 72*t* of ABS, PMMA, PC etc., or plastic-based fiber 72*a*, may also be used as the exterior skin layer over either substrate (e.g., 40/40*r*, 27/27*r*). The thermoformed sheet material 72*t* may be joined adhesively, or be fused using the variety of heat-seaming or sonic welding techniques known in the art.

With the internal reinforcement of the foam-backed structural layers 74, the placement of the bondline can be according to manufacturing considerations and/or the performance requirements of the board—thinner, high-performance surfboards, for example, often require the complete support of a solid interior foam core, but for lighter weight may require the elimination of interior layers on the bottom of the board. In the forward portion of the structural core 40, foam-backed structural layers 74 are used to create a bonding/reinforcing flange 74 at the perimeter rail so as to allow very thin skin core layer(s) 27 to be molded to the board in top and bottom halves.

Figure 9A:
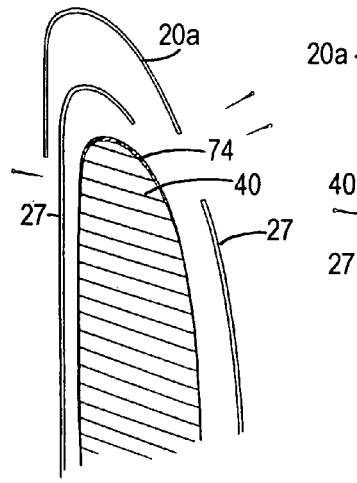
FIG. 9A is a cross-section view depicting the reinforcing layers that serve as a bonding/reinforcing flange for high-impact areas at the board's perimeter.

FIG. 9A, a cross-section view taken along lines 9A-9A of FIG. 8B, provides a more detailed view of the convex surface of the foam shape-defining structural core 40 and the internal bonding/reinforcing flange 74 that allows the board's upper and lower skin halves to be joined at the perimeter—the added strength of the smoothly molded, foam-backed structural layers 74 allows the thermoformed skin core 27 to be molded to the sharpest curvature along the length of the board's perimeter rail, and then protects the interior foam core 40 from damage so that deck and bottom skin cores 27 can be neatly razor-trimmed and joined; alternatively, the reinforcing layer(s) 74 protecting the rail make it possible for both surfaces 27 to be sanded or routed to an oblique angle, and an overlapping or semi-overlapping joint created at the perimeter rail (not shown), and high-strength facing material applied to complete the exterior skin.

Figure 9B:
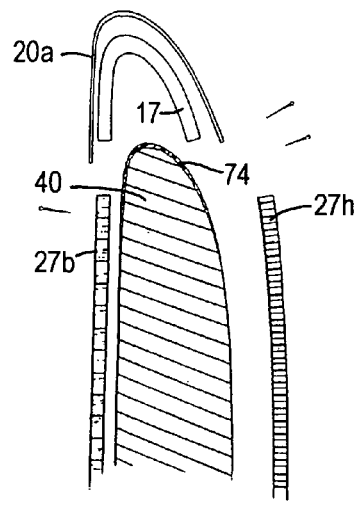
FIG. 9B is a cross-section view depicting the assembly of skin core materials on a convex mold.
Figure 9C:
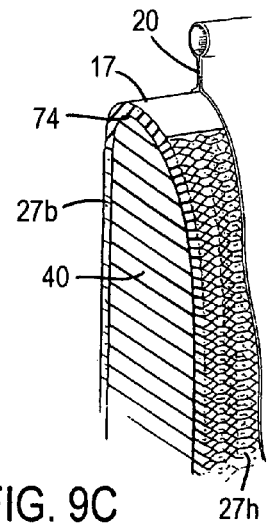
FIG. 9C is a perspective, cross-section view depicting assembled skin core materials on a convex mold.

The thermoplastic rail mold 20*a* can also be used to protect and support the perimeter of the board, so that fabrication can proceed with the board's width at right angles to the worktable. As shown FIG. 9B and FIG. 9C, the upright position allows full access to the top and bottom sides of the board and provides a very stable surface for accurate trimming and assembly—the foam mold 40 will allow the thermoformed rail 17 to be pinned to the mold; a line can then be scribed for the positioning and trimming of the end-grain balsa skin core 27*b* or the honeycomb skin core 27*h*, and, with the thermoformed mold 20*a* also aiding in the positioning and gluing process, the core materials 17/27(*b,h*) can be trimmed and glued together, so that the pre-formed perimeter rail 17 connects the broad, generally planar top and bottom surfaces of the board. After the glue has set, the single continuous surface around the perimeter of the board allows the laminate to be applied with the width of the board at right angles to the worktable, as discussed more detail below.

The mold's convex configuration and upright, accessible surface is also ideally suited for expensive thermosetting honeycomb core/prepreg skin combinations, but can be better used to eliminate the pre-preg material entirely since, when the laminate is applied, the downward flow of resin will collect in a small meniscus and create a perfect bond at the outermost edges of the walls of the individual honeycomb cells; this eliminates the need for expensive bonding films etc., the high-temperature/pressure autoclave cure, and much of the prohibitively high costs of using an "advanced composite" according to the prior art, while still preserving the very high strength-to-weight ratio of the honeycomb core material itself.

4. Application of Laminate and Completion of the Board

In an advantageous embodiment of the present invention, the board is molded in right and left halves, and the laminate is applied with the width of the board oriented at right angles to the worktable—this allows gravity to provide a very effective aid in removing excess resin, but makes the initial saturation difficult because the resin will run off the vertical surface more quickly than the cloth can be saturated. This drawback may be turned to advantage, however, because it makes it possible to use a mechanical fabric impregnator to quickly pre-saturate the fiberglass cloth—using the fabric impregnator, the reinforcing fabric can be quickly pre-saturated and draped over the convex surface; excess resin is then easily removed for higher strength and lighter weight; the fiber can be aligned and wrinkles removed simply by tugging the fabric taught; the cloth may then be trimmed to create a double overlapping joint on either side of the midsection of the rail and the very sharp convex curvature at the nose and tail. The mold's convex surface also functions as a tool that allows the composite reinforcement to be applied to the interior surface of pre-molded rail 17 in areas prone to high-impact (e.g., in the nose and tail areas, where fingers, hands, and application tools would not otherwise fit) as the thermoformed skin core 27 is placed on top.

Figure 10A:
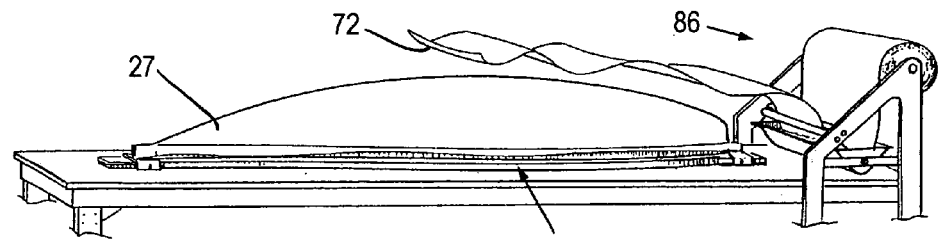
FIG. 10A depicts a board being laminated on a convex mold.

FIG. 10A is a perspective view of the laminating step showing the reinforcing fabric being run through the fabric impregnator 86 and the laminate 72 being drawn up into place to be trimmed on the surface of the mold 10 and pre-molded skin core 27. In the laminating step, the convex surface of the shape-defining mold 10 may be coated with a thin, plastic release film, followed by a first layer of laminate; the pre-molded foam skin core 27 is then placed on top, creating the inside layer of a sandwich skin, followed by the additional layer(s) of laminate that form the exterior of the structural sandwich skin; the optional female component 20 then completes the assembly—squeegee pressure can then pass directly through to the exterior layer(s) of laminate 72 while gravity and/or vacuum removes the rest—unobstructed, the resin quickly runs off the vertical sides of the shell and leaves an absolute minimum within the fiber.

In the present invention, the items being laminated are lightweight and moveable—the fabric may therefore be run almost continuously through the fabric impregnator 86 and a series of boards laminated in rapid, assembly-line fashion, while the resin remains liquid in the bath. To prevent premature hardening, the gel time of the resin may be extended, preferably to about an hour. In the present invention, the penalty of the much longer cure/mold-cycle is largely removed because the manufacturing area requirements during cure are minimal—the board may be positioned so its thickness, rather than its width, consumes shop space during hardening, and the cure time of the multiple boards that can be laminated in a single run will be an average of the gel time of the resin, or roughly half an hour using the above example.

Figure 10B:
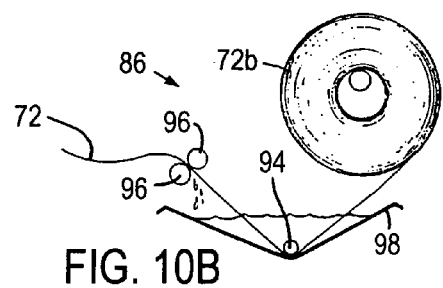
FIG. 10B is a side view of a fabric impregnator.

A profile view of a fabric impregnator 86 is provided in FIG. 10B. The bolt of reinforcing fabric 72b is depicted directly above the resin bath 98; the fabric is unrolled from the bolt and immediately saturated as it is submerged and drawn around a roller 94 in the resin bath 98, it then runs between two nip rollers 96 so that the excess resin is removed and the correct amount is left in the laminate 72.

The very complete mechanical saturation also makes it possible to replace the easily saturated, loosely woven boat or tooling fabrics commonly used in the prior art, with the difficult to saturate, tightly woven, high-strength satin or crowfoot fiberglass fabrics (more commonly used in thermosetting pre-pregs) which have resin requirements of only thirty-five percent by weight for complete saturation. Useful examples, using weave numbers shared by the various manufacturers of fiberglass reinforcing fabrics (e.g. Hexcel, Burlington, etc.), include #7781, an eight-harness satin weave weighing 8.71 oz. per square yard, and #120 crowfoot weave weighing 3.70 oz./yd. The very fine weave of the satin reinforcing fabric leaves a smoother surface and, with overlaps in the fabric restricted primarily to the nose and tail areas of the board or hidden beneath the skin core, eliminates much of the labor required to bring the surface of the board to a cosmetic finish. In the present invention, a female surface is a non-essential item in production—a very thin plastic film can be used to produce a smooth surface in the board's exterior skin.

After the resin gels and has taken an initial set, the laminated skin core 27 may be razor trimmed and excess foam/laminate material removed to create the longitudinal centerline 44 of the board; the razor will leave a sharp straight edge suitable for subsequent joining and is easily be accomplished by hand, although a strip of aluminum or similar material can be pinned to the laminated shell 27 to act as a straightedge and guide. Bonding of the exterior skin to the interior core then completes the basic board structure.

Figure 11A:
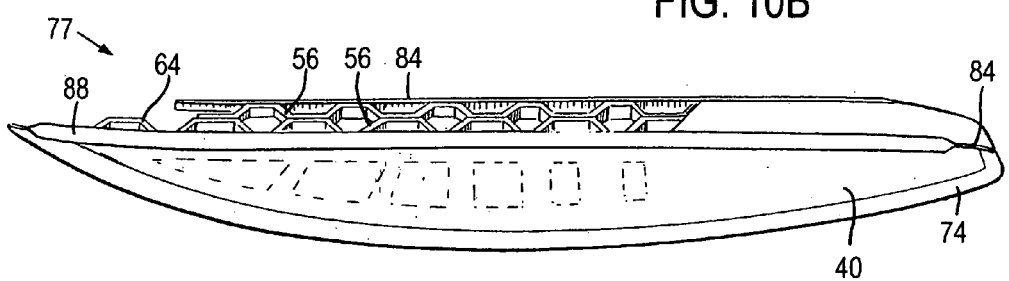
FIG. 11A is a perspective view of various shape-defining surfaces of a convex shape-defining structural core.

In FIG. 11A, the reference number 77 collectively denotes the interior core structures shown; the view depicts a longitudinal shear web/supporting strut 84 and spar cap 88 material with a bonding/reinforcing flange 74 molded around the shape-defining structural core's perimeter edge; both the spar cap 88 and reinforcing flange 74 may be molded to the shape-defining structural core 40 using female molds 20/20a of the present invention; the interior core may also include transverse ribs, shear webs, bulkheads, or supporting struts etc. (not shown). The foam areas in the interior may be bead foams (e.g. EPS, EPP) which are molded by a female shape-defining mold 10 to provide a convex shape-defining surface for the board's structural exterior skin. Any of the synthetic foams (e.g. polyurethane, polyethylene, EPS, EPP, polystyrene, polypropylene etc.), where appropriate, may be molded, shaped, or cut, using known die cutting, wire-cutting, milling, and shaping techniques, which may be numerically controlled (CNC) where applicable, to form shape-defining foam 10 or a shape-defining structural core 40. After use as a shape-defining surface 10/40, the above foams may be made lighter by removing additional material (along the dashed lines) by die cutting, a punch press, etc. to create a partially hollow, chambered foam core. The honeycomb foam core material 64 depicted may be created from sheets of foam heated to forming temperature and then thermoformed into the initial half-hexagonal cellular configuration 56, and then be cut into strips and joined together to form a cellular foam-honeycomb core 64.

Figure 11B:
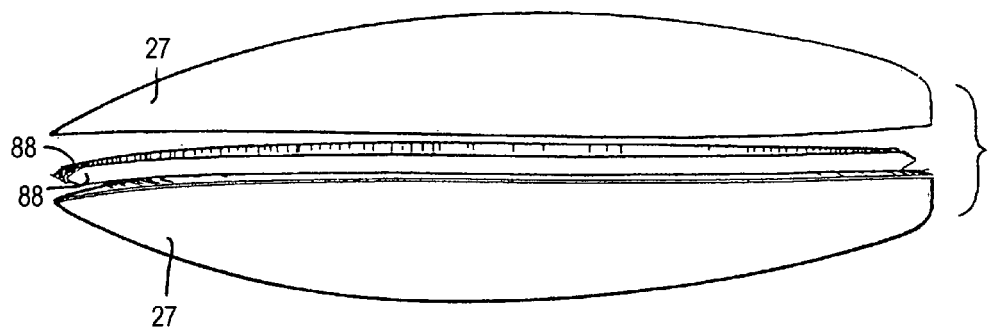
FIG. 11B depicts two halves being bonded to a bonding/reinforcing flange.

Alternatively, foam may be molded directly to the interior cavity of a pre-molded, laminated skin core 27 (not shown) when the board is molded in right and left halves (as depicted in FIG. 11B below). For example, pre-expanded foam beads may be coated with a suitable binder and then deposited into the interior of the laminated skin core 27; the coated beads may then be compressed during cure of the binder by the insertion of a third member—either specially designed for the purpose—or by use of an interior member such as a shear web 84 that becomes part of the finished structure. For expanded bead foams, the molding process can be aided by a source of positive or negative air pressure—this may be provided in the interior by a vented tube or pipe placed along the inside of the perimeter rail, which may be later removed, or by perforating and venting a shear web 84, box-beam, interior bulkhead etc. and providing fluid communication with a source of air pressure or steam which, depending on configuration, may be vented through apertures designed to accept fins or fin-boxes, plugs for leashes, footstraps, mast-tracks or the like.

Fins, boxes for same, mast-tracks, plugs for foot-straps, leashes etc. appropriate for the end use of the board may be attached using conventional methods; access to the interior prior to the introduction of the interior core will also allow a backup structure to be added concurrent with the bonding. In FIG. 11B, the two halves 27 of the board are shown before being joined, during which time a longitudinal spar may be created using pre-cured plastic composite strips 88 that serve as joining flanges in the bonding procedure, and as longitudinal reinforcing flanges or spar caps in the finished structure.

Figure 12A:
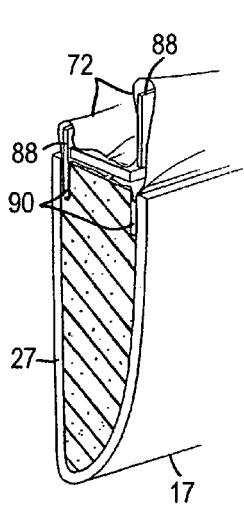
FIG. 12A is a closer, cross-sectional view of FIG. 11B.
Figure 12B:
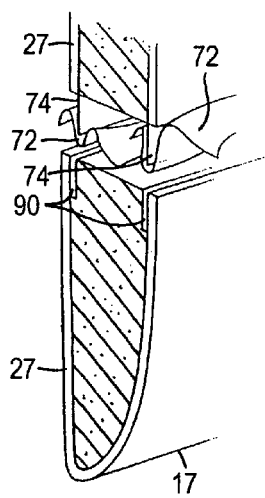
FIG. 12B is a closer, cross-sectional view of a bonding procedure using a bonding/reinforcing flange that been integrally molded to the skin core.
Figure 12C:
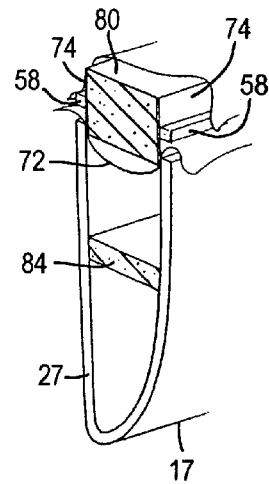
FIG. 12C is a closer, cross-sectional view of a bonding procedure where the bonding/reinforcing flange in integrally molded to a box-beam spar.

FIGS. 12A, 12B, and 12C are cross-sectional views of several bonding procedures that can be used to join the right and left-hand sides of the board together. In FIGS. 12A and 12B, a knife or other appropriate tool (not shown) has been inserted between the molded sandwich skin core 27 and the foam of the interior core 40; sufficient foam has been removed to create a slot 90 for the pre-cured composite top and bottom spar caps/joining flanges 88/74, which preferably incorporate high-strength unidirectional S-glass, Kevlar®, carbon fiber etc. running lengthwise, in a high-strength, high-temperature curing epoxy fiber-resin. The spar caps/joining flanges 88/74 provide convex surfaces that can be wrapped with fiberglass 72 saturated with the bonding resin; the spar caps/joining flanges 88/74 are then tucked into the top and bottom slots 90, and the excess fiberglass 72 that comes out of each slot 90 is used for the structural wall(s) of the shear web 84; the two halves are bonded together, completing the bonding/reinforcing flange 74, which serves as longitudinal reinforcement on the finished board 28s shown in FIG. 14. The convex shape-defining mold 10 allows the bonding/reinforcing flange 74 to be molded integrally with the skin, as shown in FIG. 12B. FIG. 12C depicts the same general bonding procedure where a box-beam spar 80 provides the bonding/reinforcing flange 74 joining the board's two opposing sides. In addition, the board's exterior skin, and the shear web and/or spar structure of the bonding/reinforcing flange 74 may incorporate thermoformed plastics, fiber reinforced thermoplastics, or traditional materials such as wood.

Figure 13A:
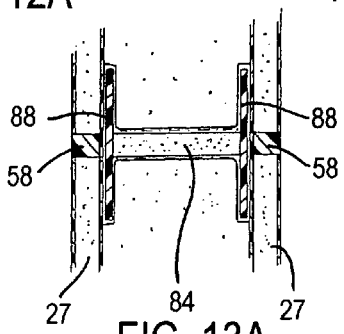
FIG. 13A is a cross-sectional view of an I-beam spar.
Figure 13B:
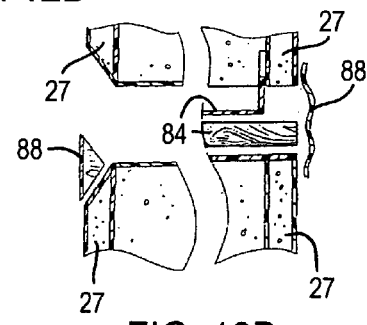
FIG. 13B is a cross-sectional view of alternate bonding/reinforcing flanges.

FIG. 13A is a cross-section view showing the shear web and spar caps (84/88) of the bonding/reinforcing flange 74 forming an I-beam spar, with the gap 58 created by the shear web 84 in the bonding operation filled with high-strength fiber such as Kevlar®, carbon-fiber or similar material. FIG. 13B is a cross-section view of alternate shear web/spar cap (84/88) configurations that can be used to create a high-strength bonding/reinforcing flange 74 providing internal reinforcement and between the board's right and left or top and bottom sides. The oblique- and right-angles in the shear web 84 are easily created in fiber-reinforced plastic using a thermoplastic mold 20*a* of the present invention; the shear web/spar cap (84/88) may incorporate materials such as wood; a spar cap 88 of fiber-reinforced plastic laminate may also be used to seal the exterior surface of the skin.

Figure 14:
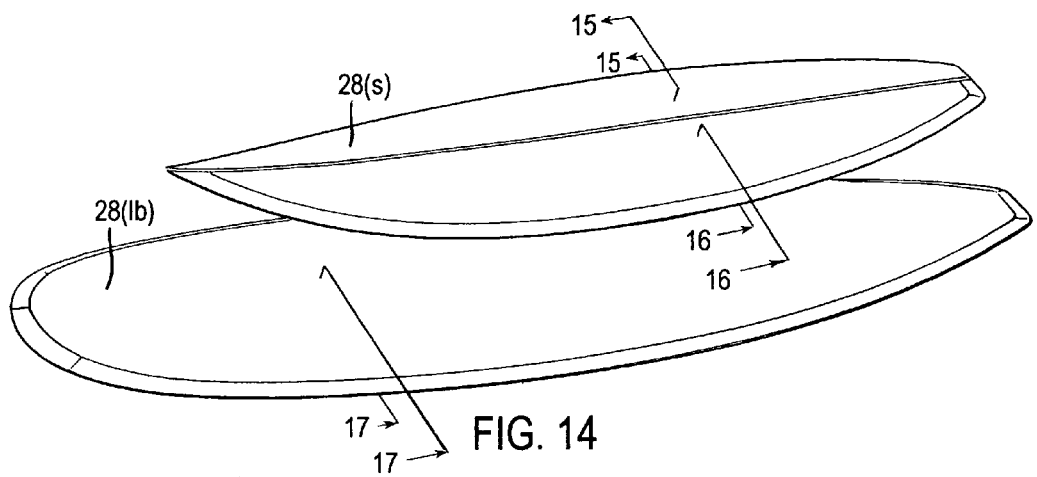
FIG. 14 is a perspective depicting two finished boards.
Figure 15:
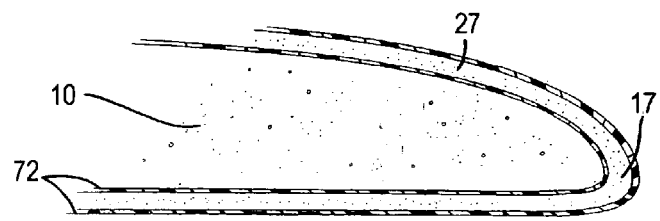
FIG. 15 is a cross-sectional view of a skin core forming a monocoque perimeter rail taken along the lines 15-15 of FIG. 14.
Figure 16:
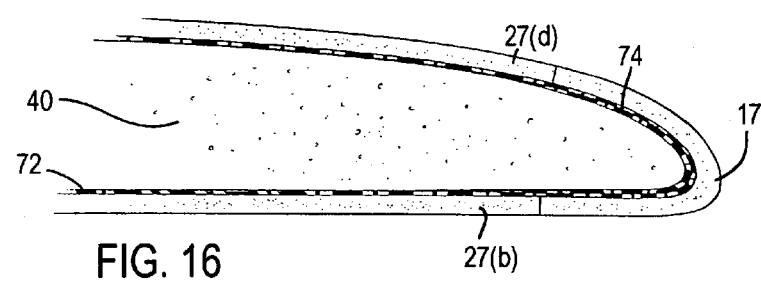
FIG. 16 is a cross-section view taken along lines 16-16 of FIG. 14.
Figure 17:
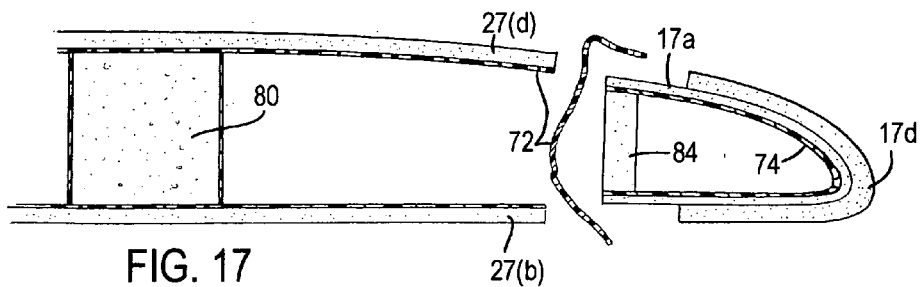
FIG. 17 is a cross-section view taken along lines 17-17 of FIG. 14.

FIG. 15, a cross-section view taken along lines 15-15 of the "short board" 28*s* depicted in FIG. 14, shows the continuity of the skin core layer 27 through the area of greatest breadth and sharpest curvature of the perimeter rail 17. In FIG. 16, a cross-section taken along lines 16-16 on the opposite side of the board 28*s* shown in FIG. 14, the view depicts a separately molded perimeter rail 17 constructed according to principles outlined in the description of FIG. 8A, where a shape-defining structural core 40 is used to define the overall shape of the deck and bottom skin core panels (27*d*, 27*b*) of the board, while the higher-density foam and continuity of core material at the pre-molded perimeter rail 17 provides very high impact resistance around the board's exposed perimeter edge. In FIG. 17, a cross-section taken along lines 17-17 of the "long-board" 28*lb* of FIG. 14, the top and bottom skin core panels (27*d*, 27*b*) are shown bonded to a shape-defining structural core 40 in the form of a box-beam spar 80, with the pre-formed perimeter rail 17*d* completing the perimeter edge. In the example shown, the double layer of high-density thermoformed plastic foam has an interior layer 17*a* that provides a convex surface for the structural layers 74 which allows the rail 17*d* to function as a bonding/reinforcing flange 74 joining the board's top and bottom sides 27(*d,b*) at the perimeter. The shear web 84 may be two-part (as shown in FIG. 8A, for example); it may also be made circular or C-shaped in cross-section (not shown) using a rail mold 70 or equivalent to pre-form the board's perimeter rail. For purposes of clarity, the latter two views show the skin core layers 27(*d,b*) without the high-strength facing material (72/72*t*, etc.) that completes the board's exterior skin.

In the present invention, the skin core is preferably thermoplastic due to the rapid mold-cycle and low overall costs of production; the scope of the invention therefore includes thermoplastic sheet materials in which the skin core substrate layer is omitted, and the thermoformed plastic is used as a single exterior skin layer covering for the substrate of the interior core. Alternatively, other specially manufactured sheet materials may be used to provide a skin core substrate: e.g., over-expanded (OX-core) honeycomb, or high-density sheet foam that is scored and attached to a fiberglass scrim, are both sufficiently conformable that they can be formed with a convex or concave mold (10/20*a*) to of the present invention to form a pre-molded perimeter rail 17, or a double thickness rail 17*d* according to the present invention. In each case, the layer of skin core can function as a shape-defining substrate for the exterior layers of the skin, as can the material used to support the skin in the board's interior core. Persons skilled in the art will also recognize that internal layers may be added or omitted depending on weight, strength, or manufacturing considerations.

Due to the versatility of the principles and methods disclosed herein, persons with knowledge of the art will appreciate that modifications may be made in mold configurations, in the order and number of manufacturing steps, and substitutions may be made in a number of materials used in the construction of the board. Therefore, the invention is not limited to the specific embodiments described above; the various modifications, alterations and substitutions that might be made by those skilled in the art are included within the spirit and scope of the present invention.

I claim:

1. A process for producing an aquatic sports board having broad generally planar top and bottom surfaces and curved edge portions, comprising:
   preforming a left side board substrate portion and a right side board substrate portion, each said portion providing a convex shape-defining exterior surface and said board substrate portions being formed to be mutually symmetrical about a common longitudinal axis; and
   vacuum thermoforming a structural exterior skin about the exterior convex surface of each of said board substrate portions, said structural exterior skin being formed with a layer of vacuum-thermoformed plastic conforming to said board substrate portion, said vacuum thermoforming being accomplished by heating said layer to facilitate deformation in proximity to said shape-defining exterior surface and evacuating the space between said layer and said surface such that said structural exterior skin has a single continuous surface on both sides of the point of greatest breadth of the board and through the area of sharpest curvature of the board surface, thereby forming a perimeter rail intermediately connecting the top and bottom surfaces of the board; and
   joining said left side board substrate portion and said right side board substrate portion together and bonding said structural exterior skin to said substrate portions, either before or after said joining, to form a complete perimeter rail portion of the board.

2. The process of claim 1, wherein
   a further vacuum-thermoformed layer is thermoformed about said exterior convex surface, such that said further vacuum-thermoformed layer forms a skin core, said skin core serving as an additional substrate within said structural exterior skin.

3. The process of claim 1, wherein
   said structural exterior skin forms a continuous shell having the shape of one side of the board, the final shape of said continuous shell being determined by a substrate of the interior core of the board, said substrate of the interior core being selected from the group comprising: low-density plastic foam, partially hollow chambered foam, a plurality of shear webs, a plurality of skin supporting struts, a longitudinal shear web, a longitudinal spar, and a bonding/reinforcing flange, or a combination thereof.

4. The process of claim 3, wherein
   said layer of thermoformed plastic forms the outermost layer.

5. The process of claim 1, wherein said process is accomplished utilizing a mold system comprising:
   a mold having a first half and a second half, symmetrical about a longitudinal axis; wherein each of said first half and said second half includes
   a first shape-defining component adapted to define the shape of a board substrate against a first axis such that said board substrate has a convex shape-defining exterior surface, said board substrate being removed from said shape-defining component subsequent to formation;
   a second shape-defining component conforming to the exterior shape of said board substrate for vacuum-thermoforming a layer of vacuum-thermoformed plastic conforming to the exterior shape of said board substrate in order to form thereby a structural exterior skin for the aquatic sports board, said layer of vacuum-thermoformed plastic then being further characterized as providing a single continuous surface on both sides of the point of greatest breadth of the board and through the area of sharpest curvature of the board surface, thereby forming a perimeter rail intermediately connecting the top and bottom surfaces of the board in order to form thereby a structural exterior skin for the aquatic sports board.

6. The process and mold system of claim 5 wherein the surface of said mold is further characterized as having the capacity to produce a plurality of different board shapes, and said mold is adapted to be referenced to an external positioning structure, such that surfaces of said mold are provided with the capacity to be moved, then fixed and set, so as to modify parameters of the design of the aquatic sports board.

7. The process and mold system of claim 5, wherein the surface of said first shape-defining component is adapted to receive a third shape-defining component, said third shape-defining component being adapted to produce a plurality of different board curvatures as measured against a second axis.

8. The process and mold system of claim 5, wherein said mold comprises a plurality of shape-defining subparts, each said subpart corresponding to a particular area of the aquatic sports board structure selected from the group comprising: a bottom, a deck, a perimeter rail, a longitudinal spar, a shear web, a thickness spacer, bottom channels, a bottom concave portion, a nose concave portion, a nose and a tail.

9. The process and mold system of claim 5 wherein said mold is formed of materials selected from the group comprising: fiber-reinforced plastic, fiber reinforced tooling plastic, metal, elastomeric rubber, thermoformed plastic, and plastic foam and combinations thereof.

10. The process and mold system of claim 5, wherein at least one part of the mold system is formed of material adapted to become part of the finished board.

11. The process and mold system of claim 5 wherein said second shape defining component is said board substrate.

12. An aquatic sports board produced by the process of claim 1.

13. The process of claim 1 wherein the interior portion of said completed board is formed of materials selected from the group consisting of foam; thermoformed plastic and fiber-reinforced plastic.

14. The process of claim 13 wherein said structural exterior skin is vacuum thermoformed about said interior portion.

* * * * *